United States Patent
Kiyota

(10) Patent No.: US 8,261,021 B2
(45) Date of Patent: Sep. 4, 2012

(54) CACHE CONTROL DEVICE AND CONTROL METHOD

(75) Inventor: Naohiro Kiyota, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 283 days.

(21) Appl. No.: 12/654,376

(22) Filed: Dec. 17, 2009

(65) Prior Publication Data

US 2010/0169577 A1  Jul. 1, 2010

(51) Int. Cl.
G06F 12/00 (2006.01)
G06F 9/30 (2006.01)

(52) U.S. Cl. ............ 711/130; 711/125; 711/E12.02; 711/E12.038; 712/206; 712/E09.033

(58) Field of Classification Search .......... 711/125, 711/130, E12.02, E12.038; 712/206, E09.033
See application file for complete search history.

(56) References Cited

U.S. PATENT DOCUMENTS

| | | | |
|---|---|---|---|
| 4,561,051 A | | 12/1985 | Rodman et al. |
| 5,265,233 A | | 11/1993 | Frailong et al. |
| 5,535,361 A | | 7/1996 | Hirata et al. |
| 5,893,165 A | | 4/1999 | Ebrahim |
| 7,337,281 B2* | | 2/2008 | Jin et al. .................. 711/143 |
| 7,529,889 B2* | | 5/2009 | Vasekin et al. .......... 711/128 |
| 2004/0162951 A1 | | 8/2004 | Jacobson et al. |
| 2005/0210204 A1 | | 9/2005 | Yamazaki |
| 2006/0031844 A1* | | 2/2006 | Dice et al. ............... 718/106 |
| 2006/0200632 A1* | | 9/2006 | Tremblay et al. ......... 711/141 |
| 2010/0100686 A1* | | 4/2010 | Kiyota ..................... 711/130 |

FOREIGN PATENT DOCUMENTS

| | | |
|---|---|---|
| JP | 05-233421 | 9/1993 |
| JP | 05-324471 | 12/1993 |
| JP | 11-003268 | 1/1999 |
| WO | 2004/068361 | 8/2004 |

OTHER PUBLICATIONS

European Search Report dated Sep. 2, 2010 in corresponding European Patent Application 07767215.2.
International Search Report issued on Feb. 19, 2008 in corresponding PCT Application No. PCT/JP2007/062376.
Dean M. Tullsen, et al., "Supporting Fine-Grained Synchronization on a Simultaneous Multithreading Processor", Proceedings of Fifth International Symposium on High-Performance Computer Architecture, Jan. 9, 1999, pp. 54-58.

(Continued)

Primary Examiner — Kevin Ellis
Assistant Examiner — Mehdi Namazi
(74) Attorney, Agent, or Firm — Staas & Halsey LLP

(57) ABSTRACT

In order to control an access request to the cache shared between a plurality of threads, a storage unit for storing a flag provided in association with each of the threads is included. If the threads enter the execution of an atomic instruction, a defined value is written to the flags stored in the storage unit. Furthermore, if the atomic instruction is completed, a defined value different from the above defined value is written, thereby displaying whether or not the threads are executing the atomic instruction. If an access request is issued from a certain thread, it is judged whether or not a thread different from the certain thread is executing the atomic instruction by referencing the flag values in the storage unit. If it is judged that another thread is executing the atomic instruction, the access request is kept standby. This makes it possible to realize the exclusive control processing necessary for processing the atomic instruction according to simple configuration.

12 Claims, 21 Drawing Sheets

OTHER PUBLICATIONS

International Preliminary Report on Patentability issued Dec. 22, 2009 in corresponding International Patent Application PCT/JP2007/062376.

English Translation of the International Preliminary Report on Patentability issued Jan. 12, 2010 in corresponding International Patent Application PCT/JP2007/062376.

* cited by examiner

CACHE CONTROL DEVICE AND CONTROL METHOD

CROSS-REFERENCE TO RELATED APPLICATION

This application is based upon and claims the benefit of priority of the prior International Application PCT/JP2007/062376 filed on Jun. 20, 2007, the entire contents of which are incorporated herein by reference.

FIELD

The embodiments discussed herein relates to a cache control device and control method used in a processor of an SMT (Simultaneous Multi Thread) system, and, more particularly to a cache control device and control method that realize, with a simple configuration, exclusive control processing necessary in processing an atomic instruction such as a CAS (Compare And Swap) instruction in the processor of the SMT system.

The processor of the SMT system is a processor that simultaneously executes plural threads. In this processor of the SMT system, since a cache is shared by the plural threads, it is necessary to construct cache control having a configuration different from that of cache control used in a processor of a single thread system.

BACKGROUND

FIGS. 17 to 21 illustrate exemplary configuration and flowchart which is studied by the inventor. A configuration of the cache control used in the processor of the single thread system is illustrated in FIG. 17.

Reference sign 1000 illustrated in FIG. 17 denotes an instruction control unit, 2000 denotes a cache control unit, 2001 denotes a cache RAM, 2002 denotes a fetch port, 2003 denotes a store port, 2004 denotes a selection circuit provided in association with the fetch port 2002, 2005 denotes a selection circuit provided in association with the store port 2003, 2006 denotes a check circuit provided in association with the fetch port 2002, 2007 denotes a check circuit provided in association with the store port 2003, 2008 denotes a check circuit provided in association with the fetch port 2002 and the store port 2003, 2009 denotes a check circuit for a discharge request, 2010 denotes an AND circuit, and 2011 denotes a priority control circuit.

As illustrated in FIG. 17, memory access requests from the instruction control unit 1000 are once held in the fetch port 2002 having plural entries present in the cache control unit 2000.

The access requests are allocated to the respective entries of the fetch port 2002 according to instruction order. However, in a processor that processes memory accesses in out of order, the access requests are read out in random order and subjected to cache access processing. When the cache access processing is completed, the entries of the fetch port 2002 are released.

An oldest entry among effective entries of the fetch port 2002 is indicated by a FP-TOQ (Fetch-Port-Top-Of-Queue) generated by a not-illustrated control circuit.

When a memory access request from the instruction control unit 1000 is a store request, the request is held in the fetch port 2002 and, at the same time, held in the store port 2003.

When the store request is processed, if there is no problem in address translation processing, sequence guarantee of access request and the like, the entry of the fetch port 2002 is released at that point. Thereafter, the store port 2003 manages store processing in the cache RAM 2001. When the store processing is completed, entry of the store port 2003 is released.

An oldest entry among effective entries of the store port 2003 is indicated by a SP-TOQ (Store-Port-Top-Of-Queue) generated by a not-illustrated control circuit.

As one of memory access requests from the instruction control unit 1000, there is an atomic load store request by a CAS instruction or the like (hereinafter referred to "fetch and store request").

Reference and update of relevant data by other instructions have to be prohibited in a period from load execution of this fetch and store request until store execution of this fetch and store request.

Therefore, when the fetch and store request accesses data A, it is necessary to provide the following conditions:

(a-1) processing of the fetch and store request is suppressed until processing of all requests for accessing the data A prior to the fetch and store request are completed;

(a-2) processing of a request for accessing the data A after the fetch and store request is suppressed until the processing of the fetch and store request is completed; and (b) discharge of the data A from the cache RAM 2001 is suppressed in a period from the start of the processing of the fetch and store request until completion of the processing, to guarantee exclusive control in the processor for fetch and store target data according to the conditions (a-1) and (a-2) and guarantee exclusive control between processors in a multiprocessor configuration according to the condition (b).

Therefore, concerning the condition (a-1), as illustrated in flowcharts of FIG. 18 and FIG. 19, the start of the processing of the fetch and store request is guaranteed by permitting, using the check circuits 2006 and 2007, the start if the entries of the fetch port 2002 and the store port 2003, in which the fetch and store request is held, are the FP-TOQ and the SP-TOQ.

In the flowchart of FIG. 18, it is assumed that access requests (request#m=request#n) stored in an entry FP#m (an m-th entry) of the fetch port 2002 and an entry SP#n (an n-th entry) of the store port 2003 are processed according to selection processing of the selection circuits 2004 and 2005.

Next, concerning the condition (a-2), as illustrated in flowcharts of FIG. 18 and FIG. 20, the start of processing of an access request other than the fetch and store request is guaranteed by suppressing, using the check circuit 2008, the start of the processing when an entry of the fetch and store request is present in a period from an entry of the FP-TOQ until an entry of the fetch port 2002 in which the access request is held and suppressing the start of the processing when, although such an entry is not present, the access request coincides with target data of a prior store request held in the store port 2003.

Concerning the condition (b), as illustrated in a flowchart of FIG. 21, the start of discharge processing of data from the cache RAM 2001 is guaranteed by suppressing, using the check circuit 2009, the start of the discharge processing when an entry of the SP-TOQ is the fetch and store request.

In the processor of the single thread system, exclusive control processing requested in execution of the fetch and store instruction is realized according to such a configuration.

On the other hand, in the processor of the SMT system, since exclusive control among threads is necessary, cache control used in the processor of the single thread system configured in this way cannot be directly used.

However, under the actual circumstances, there is no disclosure to the present concerning according to what kind of configuration the exclusive control processing requested in execution of the fetch and store instruction is realized when the processor of the SMT system is mounted.

In future, manufacturers need to construct a cache control technique having a new configuration for realizing the exclusive control processing necessary in processing the fetch and store instruction such as the CAS instruction when the processor of the SMT system is mounted.

As a technique related to the present invention, in Patent Document 1 described below, an invention for realizing guarantee of consistency of execution order for readout and writing of shared data among threads in the processor of the SMT system is described.

Patent Document 1: International Publication WO2004/068361

SUMMARY (i) First Configuration

In order to attain the object, a cache control device according to the present invention may be configured to include, in order to control access requests to a cache shared by plural threads that are simultaneously executed. The cache control device includes: (1) a storing unit provided in association with each of the threads, the storing unit storing a flag that indicates a defined value when the thread enters execution of an atomic instruction (e.g., an atomic instruction such as an atomic load store instruction) and indicates a defined value different from the value when the atomic instruction is completed; (2) a determining unit for determining, when an access request is issued from a certain thread, referring to the flag value stored by the storing unit, whether a thread different from the thread is executing an atomic instruction; (3) an executing unit for executing, when the determining unit determines that the different thread is executing the atomic instruction, processing for putting the access request on standby; (4) an instructing unit for determining, when there is a discharge request for data from a cache, referring to the flag value stored by the storing unit, whether all the threads are not executing the atomic instruction and instructing, when it is determined that all the threads are not executing the instruction, execution of the discharge processing for data from the cache; and (5) an intra-thread exclusive control unit for executing exclusive control concerning the atomic instruction in the thread referring to the flag value stored by the storing unit.

When the cache control device may be configured in this way, the cache control device further includes: (6) a second storing unit for storing information indicating which of the threads a thread that performs processing of an access request last is; (7) a second determining unit for determining, when an access request related to an atomic instruction is issued from a certain thread, concerning the threads other than the thread, whether an access request put on standby by the standby processing is present; (8) a determining unit for specifying, when the second determining unit determines that an access request put on standby by the standby processing is present, referring to the information stored by the second storing unit, a thread that performs processing of an access request last and determining whether the access request related to the atomic instruction issued from the certain thread is selected with priority given to access requests issued by the threads other than the specified thread or the access request put on standby is selected; (9) a third determining unit for determining, when an access request related to a non-atomic instruction (e.g., an instruction that is not an atomic load store instruction) is issued from a certain thread, concerning the threads other than the thread, whether there is an issuance request for an access request related to the atomic instruction; and (10) a second determining unit for specifying, when the third determining unit determines that there is an issuance request for an access request related to the atomic instruction, referring to the information stored in the second storing unit, a thread that performs processing of an access request last and determining whether the access request related to a non-atomic instruction issued from the certain thread is selected with priority given to access requests issued by the threads other than the specified thread or the access request related to the atomic instruction having the issuance request is selected.

In the cache control device according to the present invention configured in this way, when the thread enters execution of the atomic instruction, a defined value is written in relevant flags stored in the storing unit and, when the atomic instruction is completed, a defined value different from the value is written. Consequently, each of the flags indicates whether a thread associated with the flag is executing the atomic instruction.

In response to the indication of the flag value, when an access request is issued from a certain thread, it is determined by referring to the flag value stored by the storing unit whether a thread different from the thread is executing the atomic instruction. When it is determined that the different thread is executing the atomic instruction, the access request is put on standby.

When there is a discharge request for data from a cache, it is determined by referring to the flag value stored by the storing unit whether all the threads are not executing the atomic instruction. When it is determined that all the threads are not executing the instruction, execution of discharge processing of data from the cache is instructed. In other words, when the atomic instruction is being executed in any one of the threads, the discharge processing of data from the cache is put on standby.

When it is necessary to execute exclusive control concerning the atomic instruction in the threads, the exclusive control is executed by referring to the flag value stored by the storing unit.

When this configuration is adopted, if a specific one thread continues to execute the atomic instruction, an inconvenience that access requests of the threads other than the thread continue to be put on standby occurs.

Therefore, the cache control device includes second storing unit for storing information indicating which of the threads a thread that performs processing for an access request last is.

When an access request related to the atomic instruction is issued from a certain thread, if an access request put on standby by the standby processing is present concerning the threads other than the thread, a thread that performs processing of an access request last is specified by referring to the information stored by the second storing unit. It is determined whether the access request related to the atomic instruction issued from the certain thread is to be selected with priority given to access requests issued by the threads other than the specified thread or the access request put on standby is to be selected.

When this configuration is adopted and when an access request related to a non-atomic instruction is issued from a certain thread and when there is an issuance request for an access request related to an atomic instruction concerning the threads other than the thread, a thread that performs processing of an access request last is specified by referring to the information stored by the second storing unit. It is determined whether the access request related to the non-atomic instruction issued from the certain thread should be selected with priority given to access requests issued the by threads other than the specified thread or the access request relate to the atomic instruction having the issuance request is to be selected.

(ii) Second Configuration

In order to attain the object, a cache control device according to the present invention may be configured to include, in order to control access requests to a cache shared by plural threads that are simultaneously executed. The cache control device includes: (1) a storing unit provided in association with each of the threads, the storing unit storing a flag that indicates a defined value when the thread enters execution of an atomic instruction (e.g., an atomic instruction such as an atomic load store instruction) and indicates a defined value different from the value when the atomic instruction is completed and storing address information of an access destination of the atomic instruction when the thread enters execution of the atomic instruction; (2) a determining unit for determining, when an access request is issued from a certain thread, referring to the flag value stored by the storing unit, whether a thread different from the thread is executing an atomic instruction and, further, determining, when it is determined that the different thread is executing the atomic instruction, referring to the address information stored by the storing unit, whether the address information of the access destination of the atomic instruction being executed and address information designated by the access request coincide with each other; (3) an executing unit for executing, when the determining unit determines that the different thread is executing the atomic instruction and determines that the address information of the access destination of the atomic instruction being executed and the address information designated by the access request coincide with each other, processing for putting the access request on standby; (4) an instructing unit for determining, when there is a discharge request for data from a cache, referring to the flag value and the address information stored by the storing unit, whether all the threads are not executing an atomic instruction with address information coinciding with address information indicated by the discharge request set as an access destination and instructing, when it is determined that all the threads are not executing the instruction, execution of the discharge processing for data from the cache; and (5) an intra-thread exclusive control unit for executing exclusive control concerning the atomic instruction in the threads referring to the flag value and the address information stored by the storing unit.

When the cache control device may be configured in this way, the cache control device further includes: (6) a second storing unit for storing information indicating which of the threads a thread that performs processing of an access request last is; (7) a second determining unit for determining, when an access request related to an atomic instruction is issued from a certain thread, concerning the threads other than the thread, whether an access request put on standby by the standby processing is present; (8) a determining unit for specifying, when the second determining unit determines that an access request put on standby by the standby processing is present, referring to the information stored by the second storing unit, a thread that performs processing of an access request last and determining whether the access request related to the atomic instruction issued from the certain thread is to be selected with priority given to access requests issued by the threads other than the specified thread or the access request put on standby is to be selected; (9) a third determining unit for determining, when an access request related to a non-atomic instruction (e.g., an instruction that is not an atomic load store instruction) is issued from a certain thread, concerning the threads other than the thread, whether there is an issuance request for an access request related to the atomic instruction; and (10) a second determining unit for specifying, when the third determining unit determines that there is an issuance request for an access request related to the atomic instruction, referring to the information stored in the second storing unit, a thread that performs processing of an access request last and determining whether the access request related to a non-atomic instruction issued from the certain thread is to be selected with priority given to access requests issued by the threads other than the specified thread or the access request related to the atomic instruction having the issuance request is to be selected.

In the cache control device according to the present invention configured in this way, when the thread enters execution of the atomic instruction, a defined value is written in relevant flags stored in the storing unit and address information of an access destination of the atomic instruction is written in the storing unit and, when the atomic instruction is completed, a defined value different from the value written when the thread enters the atomic instruction is written in the flag. Consequently, each of the flags indicates whether a thread associated with the flag is executing the atomic instruction and stores, when the thread is executing the atomic instruction, the address information of the access destination.

In response to the indication of the flag value and the storage of the address information, when an access request is issued from a certain thread, it is determined by referring to the flag value stored by the storing unit whether a thread different from the thread is executing the atomic instruction. Further, when it is determined that the different thread is executing the atomic instruction, it is determined by referring to the address information stored by the storing unit whether address information of an access destination of the atomic instruction being executed and address information designated by an access request of the atomic instruction coincide with each other. It is determined on the basis of a result of the determination that the different thread is executing the atomic instruction. When it is determined that the address information of the access destination of the atomic instruction being executed and the address information designated by the access request coincide with each other, the access request is put on standby.

When there is a discharge request for data from a cache, it is determined by referring to the flag value and the address information stored by the storing unit whether all the threads are not executing an atomic instruction with address information coinciding with address information designated by the discharge request set as an access destination. When it is determined that all the threads are not executing the instruction, execution of discharge processing of data from the cache is instructed. In other words, when such atomic instruction is being executed in any one of the threads, the discharge processing of data from the cache is put on standby.

When it is necessary to execute exclusive control concerning the atomic instruction in the threads, the exclusive control is executed by referring to the flag value and the address information stored by the storing unit.

When this configuration is adopted, if a specific one thread continues to execute the atomic instruction, an inconvenience that access requests of the threads other than the thread continue to be put on standby occurs.

Therefore, the cache control device includes second storing unit for storing information indicating which of the threads a thread that performs processing for an access request last is.

When an access request related to the atomic instruction is issued from a certain thread and an access request put on standby by the standby processing is present concerning the threads other than the thread, a thread that performs processing of an access request last is specified by referring to the information stored by the second storing unit. It is determined whether the access request related to the atomic instruction issued from the certain thread is to be selected with priority given to access requests issued by the threads other than the specified thread or the access request put on standby is to be selected.

When this configuration is adopted and an access request related to a non-atomic instruction is issued from a certain thread and there is an issuance request for an access request related to an atomic instruction concerning the threads other than the thread, a thread that performs processing of an access request last is specified by referring to the information stored by the second storing unit. It is determined whether the access request related to the non-atomic instruction issued from the certain thread should be selected with priority given to access requests issued by the threads other than the specified thread or the access request relate to the atomic instruction having the issuance request is to be selected.

As described above, according to the present invention, it is possible to realize, with a simple configuration, exclusive control processing necessary in processing an atomic instruction such as a CAS instruction in the processor of the SMT system.

DESCRIPTION OF EMBODIMENTS

Embodiments of the present invention are explained in detail below according to a mode for carrying out the invention.

Figure 1:
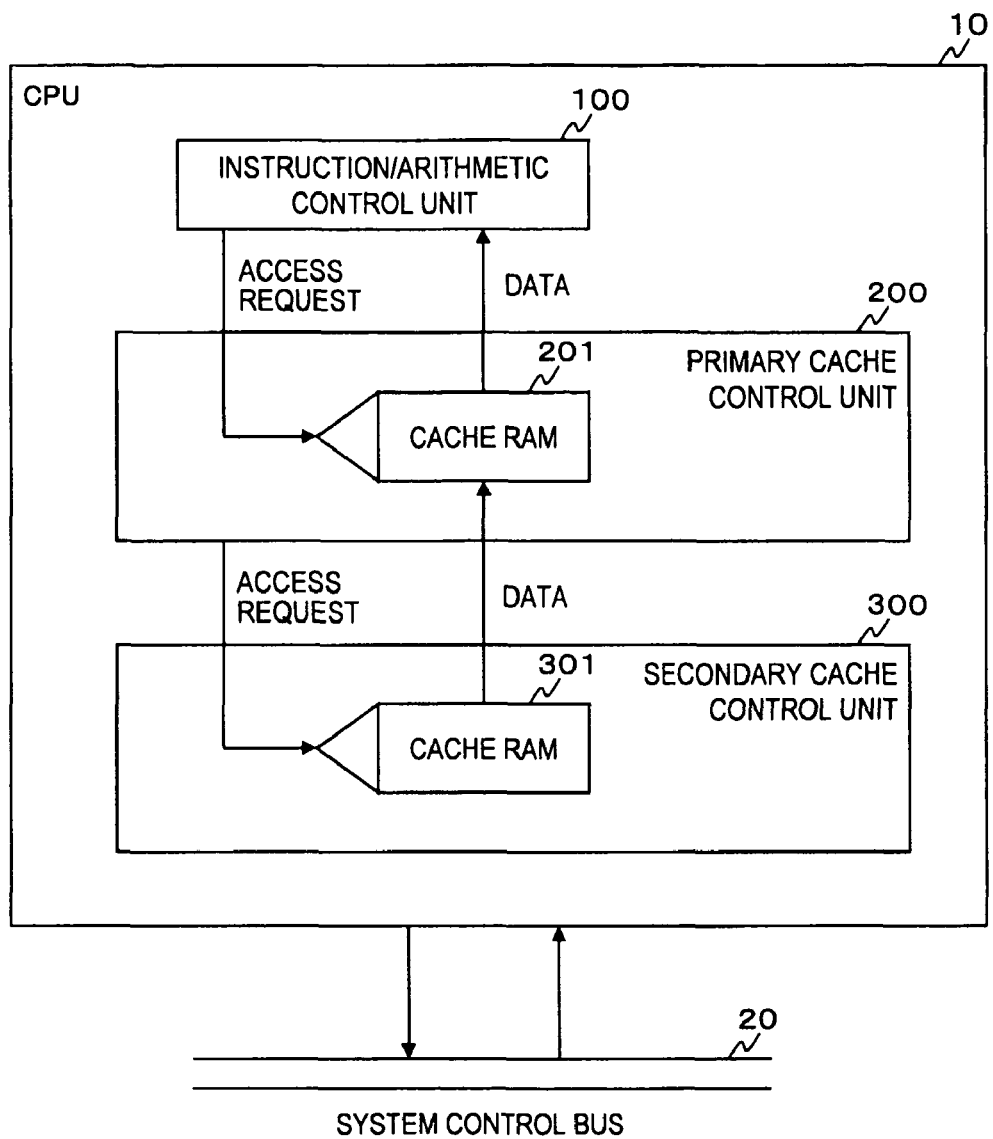
FIG. 1 illustrates a diagram of a CPU to which an embodiment of the present invention is applied.

A configuration of a CPU 10 to which an embodiment is applied is illustrated in FIG. 1.

The CPU 10 to which the embodiment is applied includes an instruction/arithmetic control unit 100, a primary cache control unit 200 and a secondary cache control unit 300. The instruction/arithmetic control unit 100 issues an extraction request for an instruction and a reflection request for arithmetic data. The primary cache control unit 200 has a high-speed and small-capacity cache RAM 201, receives an access request issued by the instruction/arithmetic control unit 100, and executes, when data of the access request is stored in the cache RAM 201, processing for returning the data to the instruction/arithmetic control unit 100. The secondary cache control unit 300 has a low-speed and large-capacity cache RAM 301, returns, when the data of the access request issued by the instruction/arithmetic control unit 100 is stored in the cache RAM 301, the data to the instruction/arithmetic control unit 100 and registers the data in the cache RAM 201, and executes, when the data is not stored in the cache RAM 301, processing for requesting a not-illustrated memory to transfer the data via a system control bus 20.

Figure 2:
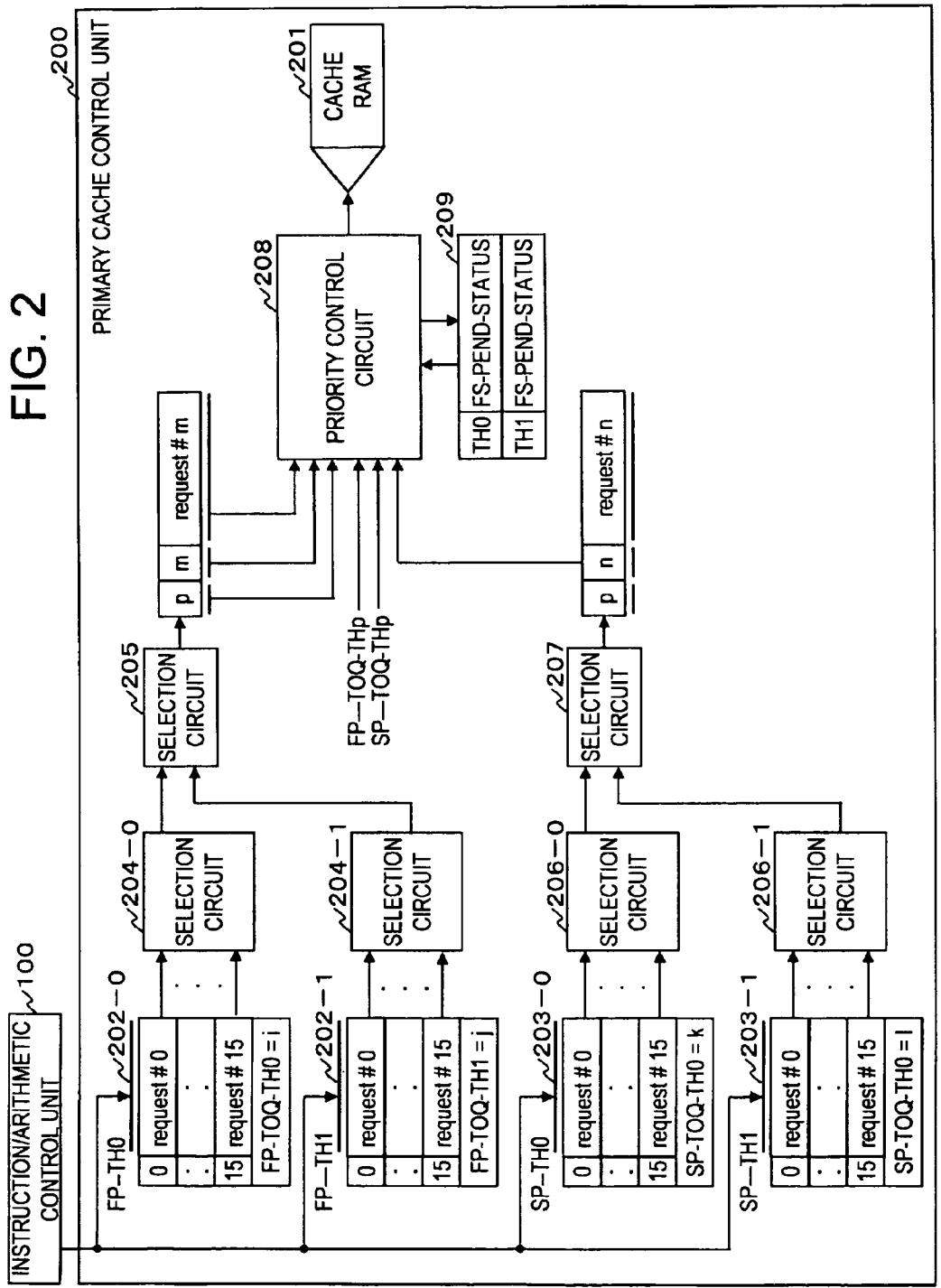
FIG. 2 illustrates an example of a primary cache control unit including the embodiment.

An example of the primary cache control unit 200 including this embodiment is illustrated in FIG. 2.

It is assumed that the primary cache control unit 200 according to this embodiment is mounted on a processor of an SMT system in which two threads, i.e., a thread 0 and a thread 1 operate and that the primary cache control unit 200 includes a fetch port having sixteen entries and a store port having sixteen entries.

The primary cache control unit 200 according to this embodiment includes, as illustrated in FIG. 2, a cache RAM 201, a fetch port 202-0 for the thread 0 (FP-TH0 illustrated in the figure), a fetch port 202-1 for the thread 1 (FP-TH1 illustrated in the figure), a store port 203-0 for the thread 0 (SP-TH0 illustrated in the figure), a store port 203-1 for the thread 1 (SP-TH1 illustrated in the figure), a selection circuit 204-0 provided in association with the fetch port 202-0, a selection circuit 204-1 provided in association with the fetch port 202-1, a selection circuit 205 provided in association with the selection circuits 204-0 and 204-1, a selection circuit 206-0 provided in association with the store port 203-0, a selection circuit 206-1 provided in association with the store port 203-1, a selection circuit 207 provided in association with the selection circuits 206-0 and 206-1, a priority control circuit 208, and a FS instruction status information storing unit 209.

Memory access requests from the instruction/arithmetic control unit 100 are once stored for each of threads in the fetch ports 202-0 and 202-1 of the primary cache control unit 200. Each of the entries of the fetch ports 202-0 and 202-1 holds the access requests until requested cache access processing is completed and releases the access requests at a point when the requested cache access processing is completed.

When a memory access request from the instruction/arithmetic control unit 100 is a store request, the memory access request is held by the fetch port 202-0 and 202-1 and, at the same time, also held in the store ports 203-0 and 203-1 for each of the threads. Each of the entries of the store ports 203-0 and 203-1 holds the access request until the requested cache access processing is completed and releases the access request at a point when the requested cache access processing is completed.

The fetch port 202-0 has sixteen entries that are cyclically used and holds access requests issued by the thread 0. The fetch port 202-0 indicates, with FP-TOQ-TH0 (Fetch-Port-Top-Of-Queue-Thread0), an entry number for holding an oldest access request for which processing is not completed among the access requests issued by the thread 0.

The fetch port 202-1 has sixteen entries that are cyclically used and holds access requests issued by the thread 1. The fetch port 202-1 indicates, with FP-TOQ-TH1 (Fetch-Port-Top-Of-Queue-Thread1), an entry number for holding an oldest access request for which processing is not completed among the access requests issued by the thread 1.

The store port 203-0 has sixteen entries that are cyclically used and holds store requests issued by the thread 0. The store port 203-0 indicates, with SP-TOQ-TH0 (Store-Port-Top-Of-Queue-Thread0), an entry number for holding an oldest store request for which processing is not completed among the store requests issued by the thread 0.

The store port 203-1 has sixteen entries that are cyclically used and holds store requests issued by the thread 1. The store port 203-1 indicates, with SP-TOQ-TH1 (Store-Port-Top-Of-Queue-Thread1), an entry number for holding an oldest store request for which processing is not completed among the store requests issued by the thread 1.

The selection circuit 204-0 is provided in association with the fetch port 202-0. The selection circuit 204-0 selects, according to a specified selection logic for giving priority to an entry indicated by FP-TOQ-TH0, an entry of the fetch port 202-0 for cache access processing requested by the thread 0 and extracts an access request from the entry.

The selection circuit 204-1 is provided in association with the fetch port 202-1. The selection circuit 204-1 selects, according to a specified selection logic for giving priority to an entry indicated by FP-TOQ-TH1, an entry of the fetch port 202-1 for cache access processing requested by the thread 1 and extracts an access request from the entry.

The selection circuit 205 selects an access request output by the selection circuit 204-0 (an access request of the thread 0) or selects an access request output by the selection circuit 204-1 (an access request of the thread 1) according to an instruction of a not-illustrated thread selection signal or the like.

The selection circuit 206-0 is provided in association with the store port 203-0. The selection circuit 206-0 selects, according to a specified selection logic for giving priority to an entry indicated by SP-TOQ-TH0, an entry of the store port 203-0 for cache access processing requested by the thread 0 and extracts an access request (a store request) from the entry.

The selection circuit 206-1 is provided in association with the store port 203-1. The selection circuit 206-1 selects, according to a specified selection logic for giving priority to an entry indicated by SP-TOQ-TH1, an entry of the store port 203-1 for cache access processing requested by the thread 1 and extracts an access request (a store request) from the entry.

The selection circuit 207 selects an access request output by the selection circuit 206-0 (an access request of the thread 0) or selects an access request output by the selection circuit 206-1 (an access request of the thread 1) according to an instruction of a not-illustrated thread selection signal or the like.

The priority control circuit 208 is input with the access request selected by the selection circuit 205, FP-TOQ-TH0 or FP-TOQ-TH1 held by the fetch port 202-0 or 202-1 provided in association with the thread that issues the access request, SP-TOQ-TH0 or SP-TOQ-TH1 held by the store port 203-0 or 203-1 provided in association with the thread that issues the access request, information indicating in which entry from the top of the fetch port 202-0 or 202-1 the access request selected by the selection circuit 205 is stored (in the figure, it is assumed that the entry is an mth entry), and information indicating in which entry from the top of the store port 203-0 or 203-1 the access request selected by the selection circuit 207 is stored (in the figure, it is assumed that the entry is an nth entry). The priority control circuit 208 writes FS instruction status information in the FS instruction status information storing unit 209 and determines, referring to the written FS instruction status information, whether processing of the access request selected by the selection circuit 205 is executed or execution of the processing is put on standby.

The FS instruction status information storing unit 209 stores FS instruction status information (FS-PEND-STATUS-TH0) that is stored in association with the thread 0 and indicates "1" when the thread 0 is executing a fetch and store request and indicates "0" when the thread 0 is not executing the fetch and store request. The FS instruction status information storing unit 209 also stores FS instruction status information (FS-PEND-STATUS-TH1) that is stored in association with the thread 1 and indicates "1" when the thread 1 is executing a fetch and store request and indicates "0" when the thread 1 is not executing the fetch and store request.

As explained later, the signals FS-PEND-STATUS-TH0 and FS-PEND-STATUS-TH1 are set to 1 at a point when processing of the fetch and store request is started and reset to 0 at a point when the processing of the fetch and store request is completed.

In FIG. 2, it is assumed that an access request (request#m) held in the m-th entry of the fetch port 202-$p$ provided in association with a thread p (p=1 or 0) is selected according to selection processing of the selection circuits 204-0 and 204-1 and the selection circuit 205. It is also assumed that an access request (request#n=request#n) held in an nth entry of a store port 203-$p$ provided in association with the thread p is selected according to selection processing of the selection circuits 206-0 and 206-1 and the selection circuit 207.

In the following explanation, a thread that issues the access request selected by the selection circuit 205 is described as a thread p (p=1 or 0) and the other thread is described as a thread q (q=0 or 1).

Reference and update of relevant data by other instructions including threads other than the thread that issues the fetch and store request have to be prohibited in a period from load of the fetch and store request from the instruction/arithmetic control unit 100 until store execution.

Therefore, when a fetch and store request of a thread x accesses data X, it is necessary to provide the following conditions:

(a-1) processing of the fetch and store request is suppressed until processing of all requests of the thread x for accessing the data X prior to the fetch and store request are completed;

(a-2) processing of a request of the thread x for accessing the data X after the fetch and store request is suppressed until the processing of the fetch and store request is completed;

(b) discharge of the data X from the cache RAM 201 is suppressed in a period from the start of the processing of the fetch and store request until completion of the processing; and (c) processing of requests of the threads other than the thread x that accesses the data X is suppressed until the processing of the fetch and store request is completed in the period from the start of the processing of the fetch and store request until completion of the processing to guarantee exclusive control in the threads for fetch and store target data according to the conditions (a-1) and (a-2), guarantee exclusive control between processors in a multi-processor configuration according to the condition (b), and guarantee exclusive control between threads in a processor according to the condition (c).

As an example of a system for realizing these kinds of exclusive control, there is a system for setting the number of fetch and store requests to be processed to one per all threads in a processor and unconditionally suppressing all kinds of processing of other access requests during the processing of the fetch and store requests.

Examples of flowcharts executed by the priority control circuit 208 that realizes exclusive control according to this system are illustrated in FIGS. 3 to 8. In the explanation of these flowcharts, attention is paid to a fetch and store request issued from the thread p of the two threads. The other thread is represented as thread q.

Figure 3:
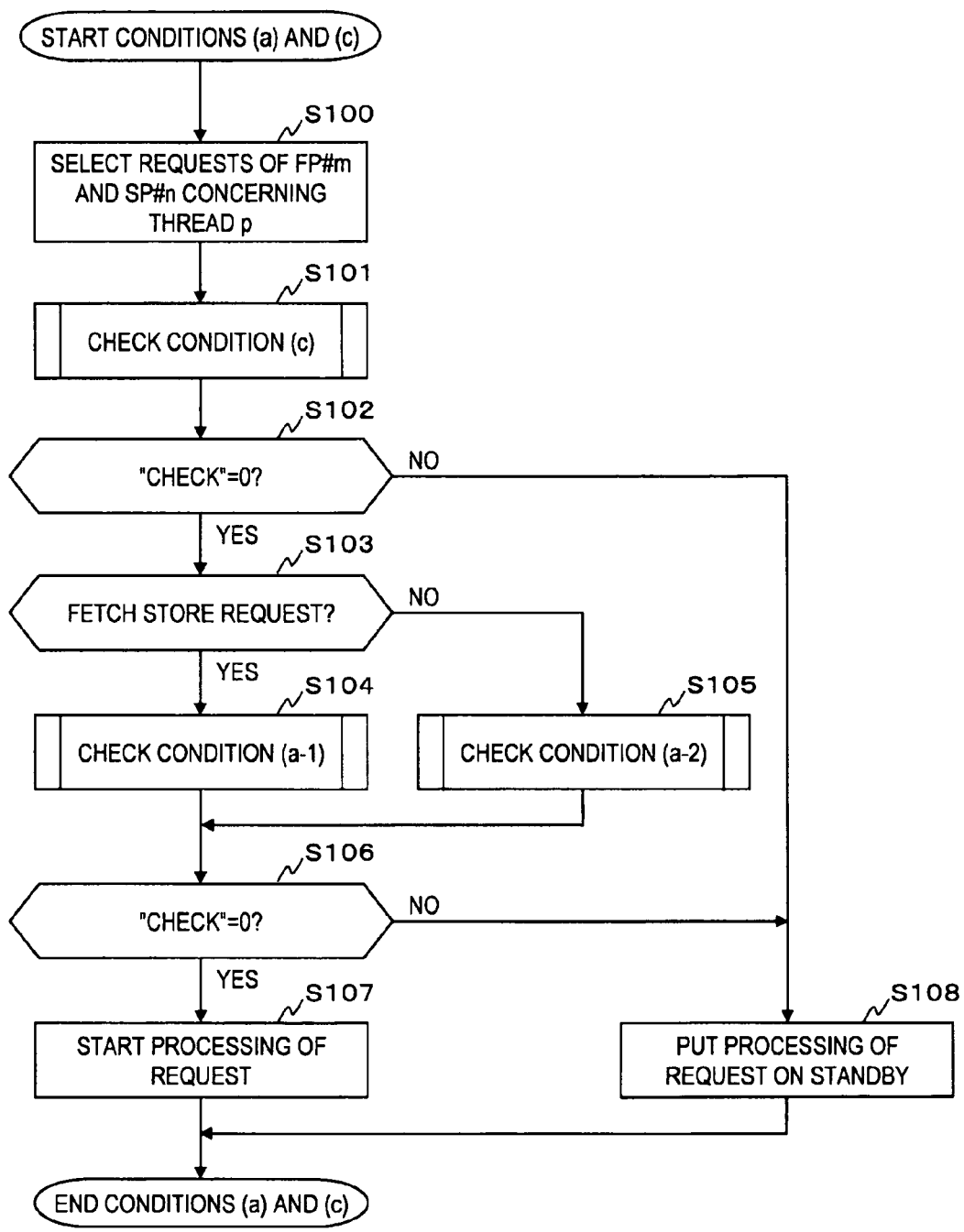
FIG. 3 illustrates a flowchart executed by a priority control circuit.

As illustrated in the flowchart of FIG. 3, first, in step S100, the priority control circuit 208 receives input of an access request (request#m) selected by the selection circuit 205 and an access request (request#n=request#m) selected by the selection circuit 207 to receive input of an access request (request#m) held in the mth entry of the fetch port 202-$p$ concerning the thread p and receive input indicating that the access request is held in the mth entry of the fetch port 202-$p$ and the access request is held in the nth entry of the store port 203-$p$.

Subsequently, in step S101, the priority control circuit 208 performs check concerning the condition (c) according to the flowchart of FIG. 4.

Figure 4:
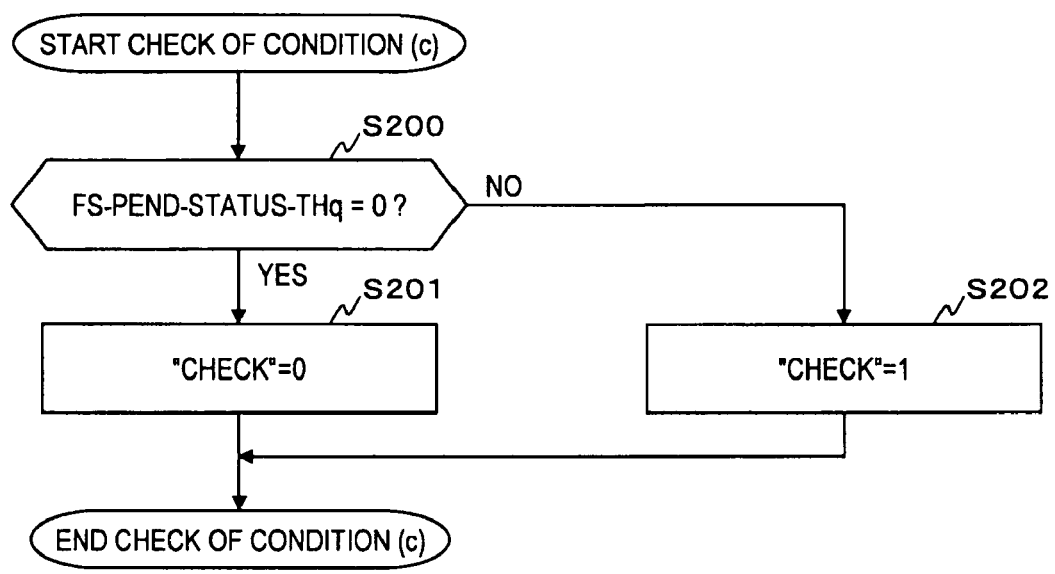
FIG. 4 illustrates a flowchart executed by the priority control circuit.

Specifically, as illustrated in the flowchart of FIG. 4, the priority control circuit 208 determines whether a value of FS-PEND-STATUS-THq concerning the other thread q stored in the FS instruction status information storing unit 209 is 0. When the value is 0 (that is, when the thread q is not executing a fetch and store request), the priority control circuit 208 sets 0 in a variable "check". When the value is 1 (that is, when the thread q is executing the fetch and store request), the priority control circuit 208 sets 1 in the variable "check".

As explained later, the priority control circuit 208 starts processing of access requests when 0 is set in the variable "check" and puts the processing of access requests on standby when 1 is set in the variable "check". Therefore, the priority control circuit 208 performs check concerning the condition (c) according to the flowchart of FIG. 4.

Subsequently, in step S102 of the flowchart of FIG. 3, the priority control circuit 208 determines whether a value of the variable "check" is 0. When it is determined that the value of the variable "check" is 1 rather than 0, the priority control circuit 208 proceeds to step S108, puts processing of the access request of the thread p selected by the selection circuit 205 on standby, and ends the processing in order to wait for completion of processing of a preceding request.

In other words, since the other thread q is executing the fetch and store request, the priority control circuit 208 puts processing of the access request of the thread p selected by the selection circuit 205 on standby.

On the other hand, when it is determined in the determination processing in step S102 that the value of the variable "check" is 0, the priority control circuit 208 proceeds to step S103 and determines whether the access request selected by the selection circuit 205 is the fetch and store request.

Figure 5:
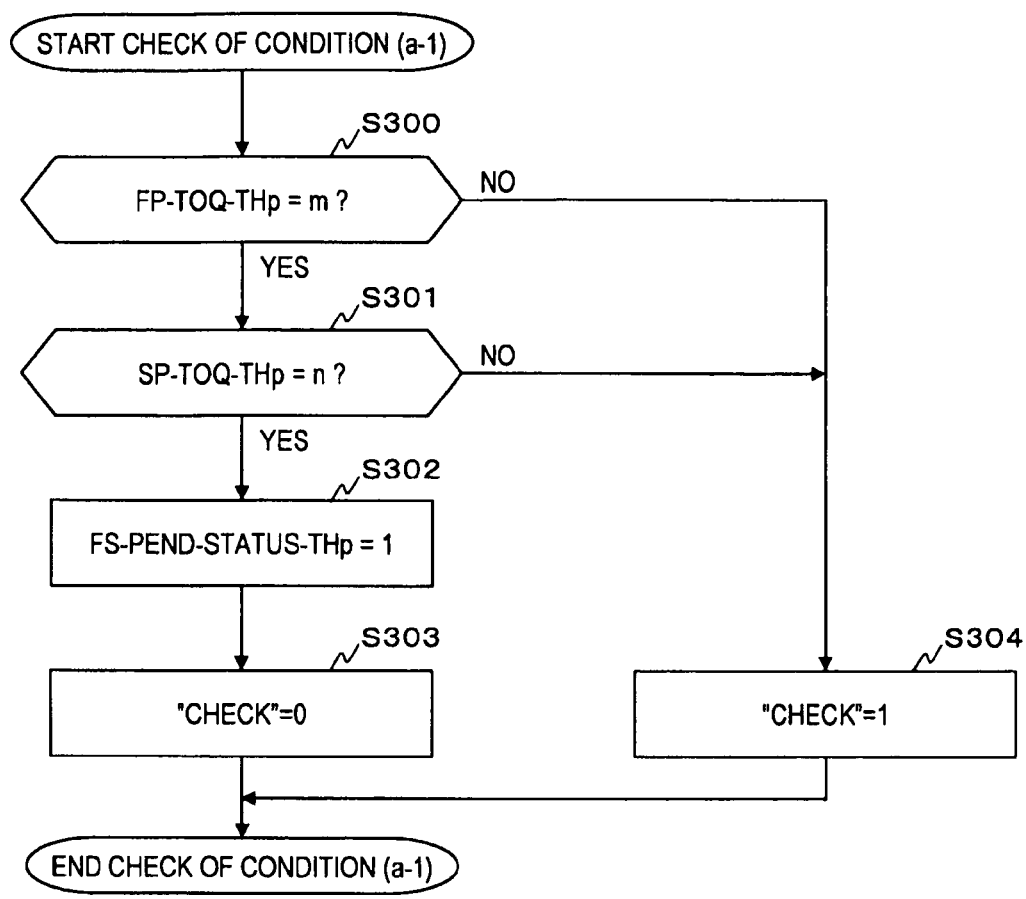
FIG. 5 illustrates a flowchart executed by the priority control circuit.

When it is determined in the determination processing in step S103 that the access request selected by the selection circuit 205 is the fetch and store request, the priority control circuit 208 proceeds to step S104 and performs check concerning the condition (a-1) according to the flowchart of FIG. 5.

Specifically, as illustrated in the flowchart of FIG. 5, when FP-TOQ-THp indicates an m-th entry and SP-TOQ-THp indicates an n-th entry, this indicates that the thread p may enter execution because the fetch and store request selected by the selection circuit 205 is an oldest access request. Therefore, the priority control circuit 208 sets 0 in the variable "check", sets 1 in FS-PEND-STATUS-THp in order to indicate that the thread p enters processing of the fetch and store request. Otherwise, the priority control circuit 208 sets 1 in the variable "check" to perform check concerning the condition (a-1).

Figure 6:
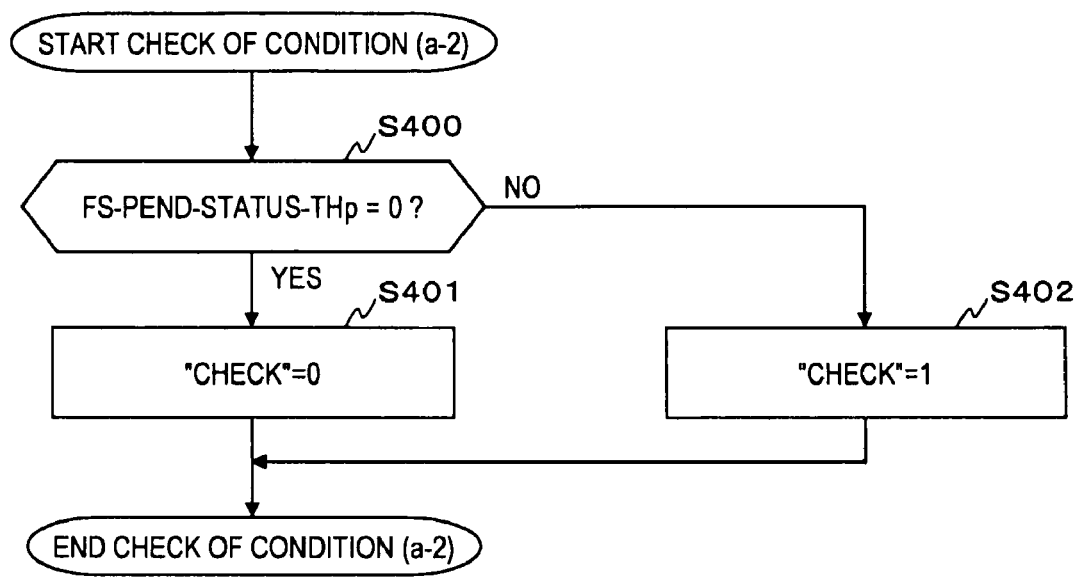
FIG. 6 illustrates a flowchart executed by the priority control circuit.

On the other hand, when it is determined in the determination processing in step S103 of the flowchart of FIG. 3 that the access request selected by the selection circuit 205 is not the fetch and store request, the priority control circuit 208 proceeds to step S105 and performs check concerning the condition (a-2) according to the flowchart of FIG. 6.

Specifically, as illustrated in the flowchart of FIG. 6, the priority control circuit 208 determines whether a value of FS-PEND-STATUS-THp concerning the thread p stored in the FS instruction status information storing unit 209 is 0. When the value is 0 (that is, when the thread p is not executing the fetch and store request), the priority control circuit 208 sets 0 in the variable "check". When the value is 1 (that is, when the thread p is executing the fetch and store request), since the access request selected by the selection circuit 205 is not be executed because of prior execution of the fetch and store request, the priority control circuit 208 sets 1 in the variable "check" to perform check concerning the condition (a-2).

Subsequently, in step S106 of the flowchart of FIG. 3, the priority control circuit 208 determines whether a value of the variable "check" is 0. When it is determined that the value of the variable "check" is 0, the priority control circuit 208 proceeds to step S107 and starts processing of the access request of the thread p selected by the selection circuit 205. On the other hand, when it is determined that the value of the variable "check" is 1, the priority control circuit 208 proceeds to step S108, puts processing of the access request of the thread p selected by the selection circuit 205 on standby, and ends the processing in order to wait for completion of processing of a prior request.

Thereafter, at a point when load and store processing of the fetch and store request is completed, the priority control circuit 208 resets FS-PEND-STATUS-THp to 0 and resumes the processing of the other request put on standby.

Figure 7:
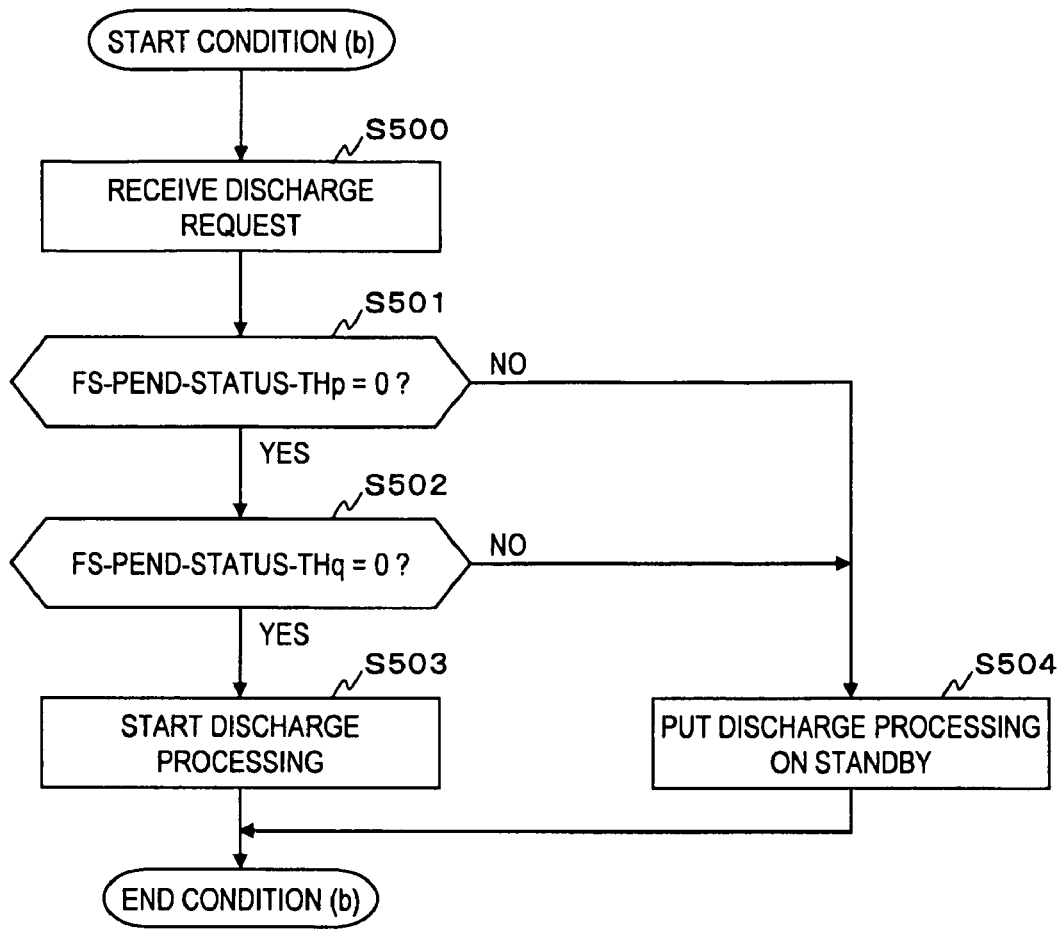
FIG. 7 illustrates a flowchart executed by the priority control circuit.

On the other hand, concerning the condition (b), the priority control circuit 208 performs check of the condition (b) according to the flowchart of FIG. 7.

Specifically, as illustrated in the flowchart of FIG. 7, when it is determined that the thread p is not executing the fetch and store request because the value of FS-PEND-STATUS-THp concerning the thread p stored in the FS instruction status information storing unit 209 is 0 and determined that the thread q is not executing the fetch and store request because the value of FS-PEND-STATUS-THq concerning the thread q stored in the FS instruction status information storing unit 209 is 0, the priority control circuit 208 starts discharge of relevant data from the cache RAM 201. Otherwise, the priority control circuit 208 puts discharge of relevant data from the cache RAM 201 on standby.

In this way, according to the embodiment, it is possible to realize, with a simple configuration, exclusive control processing necessary in processing a fetch and store request in the processor of the SMT system.

As it is seen from the above explanation, when any one of the threads starts processing of the fetch and store request, processing of access requests of all the other threads is suppressed until completion of the processing. Therefore, when plural fetch and store requests continue to be issued by a certain thread and only access requests of the thread continue to be processed, it occurs that processing in other threads does not proceed at all.

Therefore, after the processing of the fetch and store request is completed, when an entry of the fetch and store request is selected again in a fetch port of the thread, if some access request is held up in fetch ports of the other threads, at least one of access requests of the other threads is completed and the processing of the fetch and store request is not performed until the access request is completed. In this way, stagnation of processing of requests of the other threads is prevented.

Figure 8:
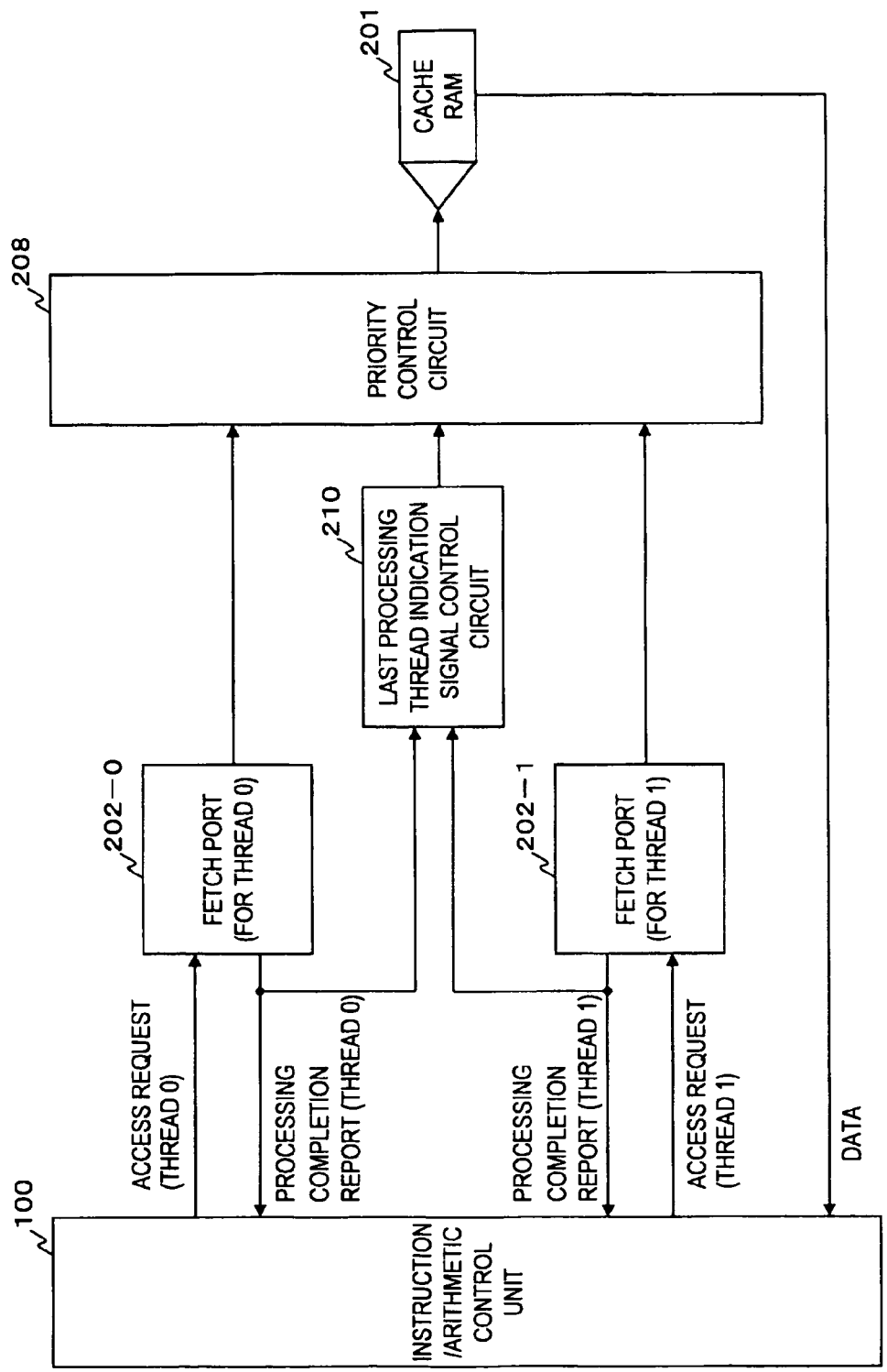
FIG. 8 illustrates an explanatory diagram of a last processing thread indication signal control circuit.

In order to realize this, as illustrated in FIG. 8, the cache control device includes a last processing thread indication signal control circuit 210 that generates a last processing thread indication signal (REQ-TAKEN-THREAD) indicating a thread that issues an access request for which processing is completed last.

This last processing thread indication signal control circuit 210 generates REQ-TAKEN-THREAD by setting, when processing of some access request is completed, a thread number of a thread that completes the access request. Therefore, for example, in the case of two threads, when REQ-TAKEN-THREAD indicates 0, this means that a thread that completes processing of an access request last is the thread 0. When REQ-TAKEN-THREAD indicates 1, this means that a thread that completes processing of an access request last is the thread 1.

Figure 9:
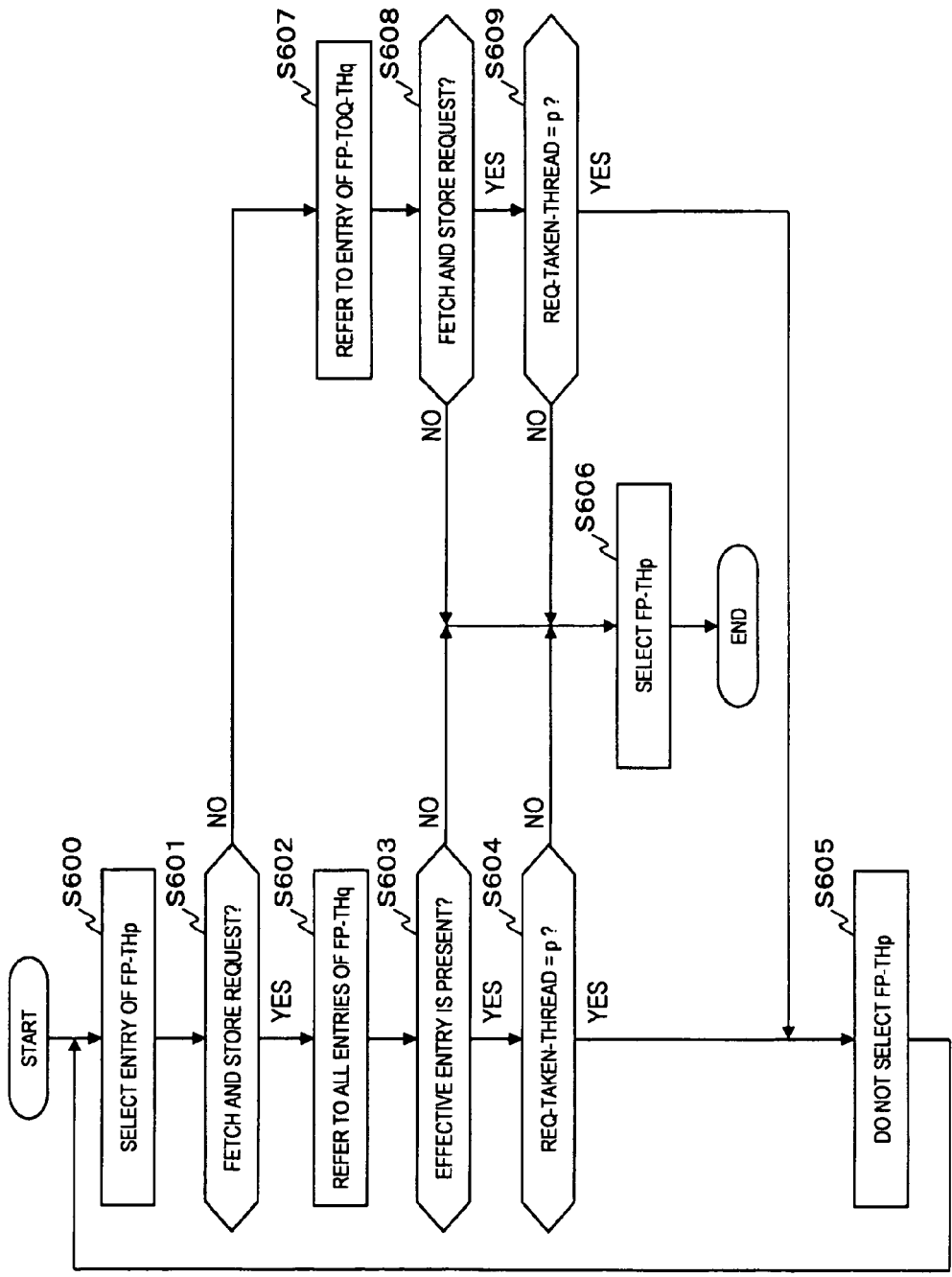
FIG. 9 illustrates a flowchart executed by the priority control circuit.

A flowchart executed by the priority control circuit 208 when the cache control device includes the last processing thread indication signal control circuit 210 is illustrated in FIG. 9.

Processing executed by the priority control circuit 208 in order to prevent, using REQ-TAKEN-THREAD is explained in detail according to this flowchart, only access requests of a specific thread from continuing to be processed.

As illustrated in the flowchart of FIG. 9, first, in step S600, the priority control circuit 208 selects an access request of an execution request by selecting an entry of the fetch port 202-$p$ of the thread p. Subsequently, in step S601, the priority control circuit 208 determines whether the access request is a fetch and store request.

When it is determined according to this determination processing that the access request of the execution request is the fetch and store request, the priority control circuit 208 proceeds to step S602 and refers to all entries of the fetch port 202-$q$ of the other thread q.

Subsequently, in step S603, the priority control circuit 208 determines whether an effective entry is present among the entries of the fetch port 202-$q$ referred to. When it is determined that the effective entry is present, i.e., when it is determined that an access request of the thread q put on standby because of the fetch and store request is present, the priority control circuit 208 proceeds to step S604 and determines whether REQ-TAKEN-THREAD indicates that a thread that completes processing last is the thread p.

When it is determined according to this determination processing that REQ-TAKEN-THREAD indicates the thread that completes processing last is the thread p, the priority control circuit 208 proceeds to step S605 and selects an access request of the thread q without selecting an access request of the thread p.

Specifically, since the thread that completes processing last is the thread p, if a fetch and store request of the thread p is also selected this time, processing of an access request of the thread q stagnates. Therefore, the priority control circuit 208 selects an access request of the thread q without selecting an access request of the thread p.

On the other hand, when an effective entry is not present among the entries of the fetch port 202-$q$ in step S603, an access request of the thread q cannot be selected. Therefore, the priority control circuit 208 proceeds to step S606 and selects an access request (in this case, a fetch and store request) of the thread p.

When REQ-TAKEN-THREAD indicates in step S604 that the thread that completes processing last is the thread q rather than the thread p, processing of an access request of the thread q does not stagnate. Therefore, the priority control circuit 208 proceeds to step S606 and selects an access request (in this case, a fetch and store request) of the thread p.

On the other hand, when it is determined in the determination processing in step S601 that the access request of the thread p having the execution request is not a fetch and store request, the priority control circuit 208 proceeds to step S607 and refers to an entry indicated by FP-TOQ-THq.

Subsequently, in step S608, the priority control circuit 208 determines whether an access request of the thread q held in the entry referred to is a fetch and store request. When it is determined that the access request is the fetch and store request, the priority control circuit 208 proceeds to step S609 and determines whether REQ-TAKEN-THREAD indicates that the thread that completes processing last is the thread p.

When it is determined according to this determination processing that REQ-TAKEN-THREAD indicates that the thread that completes processing last is the thread p, the priority control circuit 208 proceeds to step S605 and selects an access request of the thread q without selecting an access request of the thread p.

Specifically, since the thread that completes processing last is the thread p, if an access request of the thread p is also selected this time, processing of an access request (in this case, a fetch and store request) of the thread q stagnates. Therefore, the priority control circuit 208 selects an access request (in this case, a fetch and store request) of the thread q without selecting an access request of the thread p.

On the other hand, when it is determined in step S608 that the access request of the thread q held by the entry indicated by FP-TOQ-THq is not the fetch and store request, an access request is not excluded. Therefore, the priority control circuit 208 proceeds to step S606 and selects an access request (in this case, an access request except a fetch and store request) of the thread p.

When REQ-TAKEN-THREAD indicates in step S609 that the thread that executes processing last is the thread q rather than the thread p, processing of an access request of the thread q does not stagnate. Therefore, the priority control circuit 208 proceeds to step S606 and selects an access request (in this case, an access request except a fetch and store request) of the thread p.

In this way, the priority control circuit 208 performs processing according to the flowchart of FIG. 9 and using REQ- TAKEN-THREAD to prevent only access requests of a specific thread from continuing to be processed.

Next, processing realized by the flowchart of FIG. 9 is specifically explained.

When plural fetch and store requests are held in the fetch port 202-0, when processing of a first fetch and store request is completed, the priority control circuit 208 sets REQ-TAKEN-THREAD to 0.

Subsequently, when an entry of the following fetch and store request is selected in the fetch port 202-0, the priority control circuit 208 determines whether an access request is held in the other fetch port 202-1. When one or more access requests are held and REQ-TAKEN-THREAD is 0, the priority control circuit 208 selects an access request of the thread 1 read out from the fetch port 202-1 and processes the access request without selecting an access request of the fetch port 202-0.

At a point when the processing of the access request of the thread 1 is completed, the priority control circuit 208 sets REQ-TAKEN-THREAD to 1. Thereafter, when an entry of a fetch and store request of the thread 0 held up in the fetch port 202-0 is selected, the priority control circuit 208 determines whether an access request is held in the other fetch port 202-1. Even if some access request is held, since REQ-TAKEN-THREAD is 1, the priority control circuit 208 starts processing of a fetch and store request of the thread 0.

At a point when processing of the access request of the thread 0 is completed, the priority control circuit 208 sets REQ-TAKEN-THREAD to 0. Consequently, it is possible to prevent processing of access requests of other threads from stagnating because of processing of a fetch and store request.

In the embodiments explained above, the system for setting the number of fetch and store requests to be processed to one per all threads in a processor and unconditionally suppressing all kinds of processing of other access requests during the processing of the fetch and store requests is used. However, as an example of another system, there is a system for setting the number of fetch and store requests to be processed to one for each of threads in a processor and suppressing only processing of other access requests for referring to and updating target data of a fetch and store request.

When this system is used, in addition to the conditions (a-1), (a-2), (b), and (c), processing of a fetch and store request is suppressed on condition that target data coincide with each other.

Figure 10:
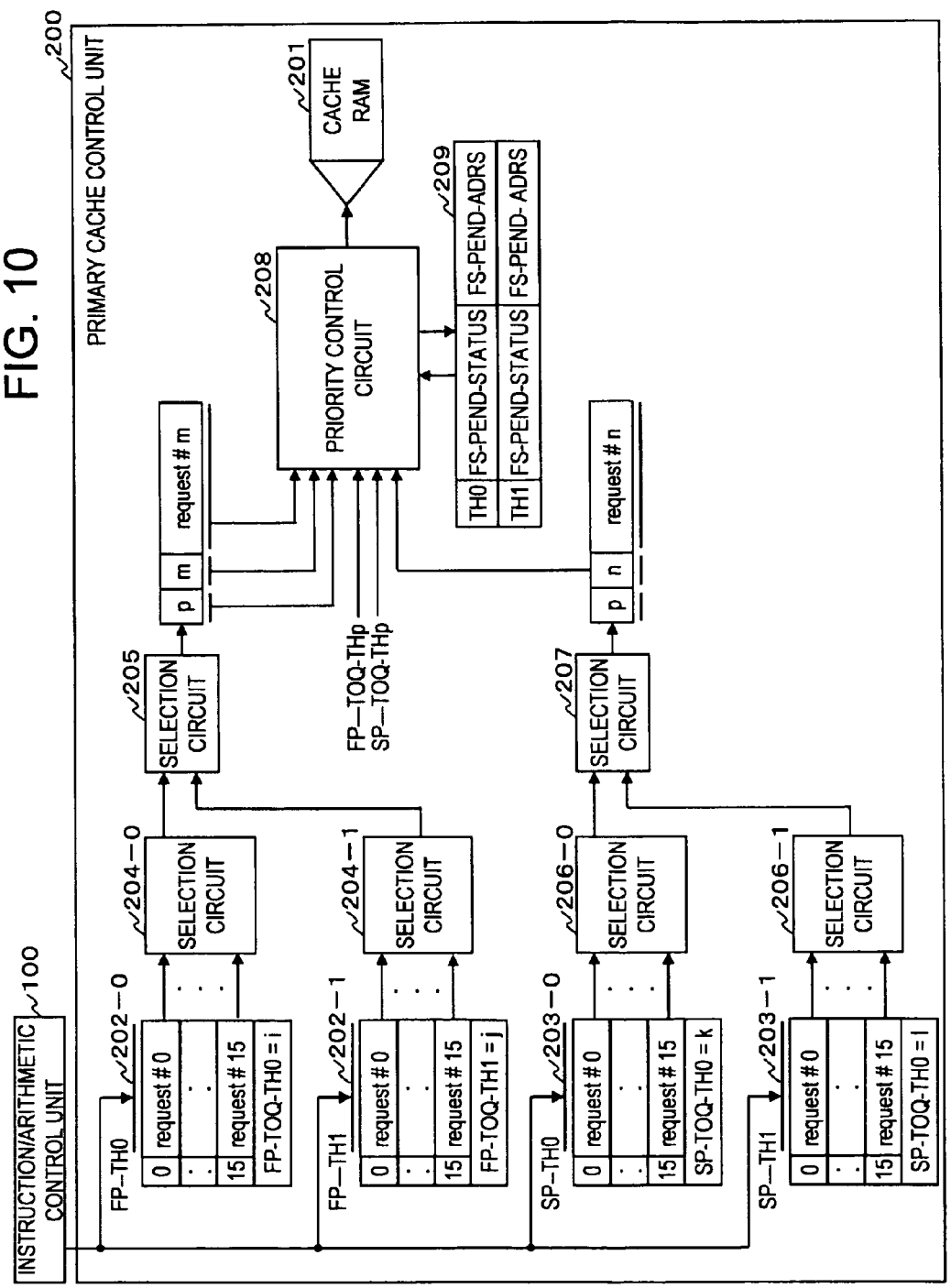
FIG. 10 illustrates another example of the primary cache control unit including the embodiment.

Another example of the primary cache control unit 200 for realizing exclusive control according to this system is illustrated in FIG. 10.

According to this example, in addition to the storage of FS-PEND-STATUS-TH0 and FS-PEND-STATUS-TH1, the FS instruction status information storing unit 209 stores, using a register, FS-PEND-ADRS-TH0 stored in association with the thread 0 and indicating an address of target data of a fetch and store request of the thread 0 and stores, using a register, FS-PEND-ADRS-TH1 stored in association with the thread 1 and indicating an address of target data of a fetch and store request of the thread 1.

At a point when processing of the fetch and store requests is started, the addresses of the target data thereof are set in these registers. The registers indicate effective values in association with the respective threads while values of FS-PEND-STATUS-TH0 and FS-PEND-STATUS-TH1 are 1.

Examples of flowcharts executed by the priority control circuit 208 that realizes exclusive control according to this system is illustrated in FIGS. 11 to 16. In the explanation of these flowcharts, attention is paid to a fetch and store request issued from the thread p of the two threads. The other thread is represented as thread q.

Figure 11:
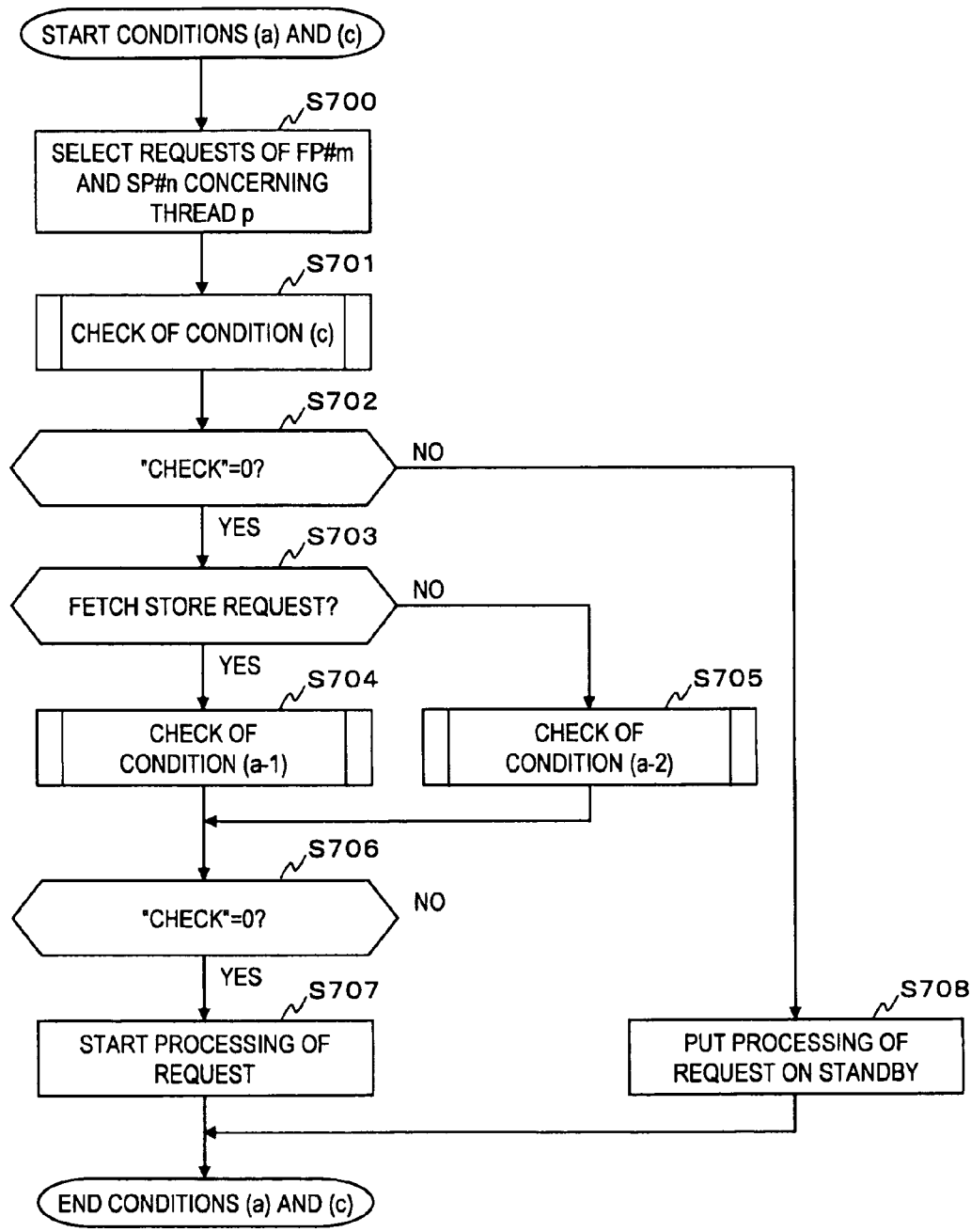
FIG. 11 illustrates a flowchart executed by the priority control circuit.

As illustrated in the flowchart of FIG. 11, first, in step S700, the priority control circuit 208 receives input of an access request (request#m) selected by the selection circuit 205 and an access request (request#n=request#m) selected by the selection circuit 207 to receive input of an access request (request#m) held in the m-th entry of the fetch port 202-$p$ concerning the thread p and receive input indicating that the access request is held in the m-th entry of the fetch port 202-$p$ and the access request is held in the n-th entry of the store port 203-$p$.

Subsequently, in step S701, the priority control circuit 208 performs check concerning the condition (c) according to the flowchart of FIG. 12.

Figure 12:
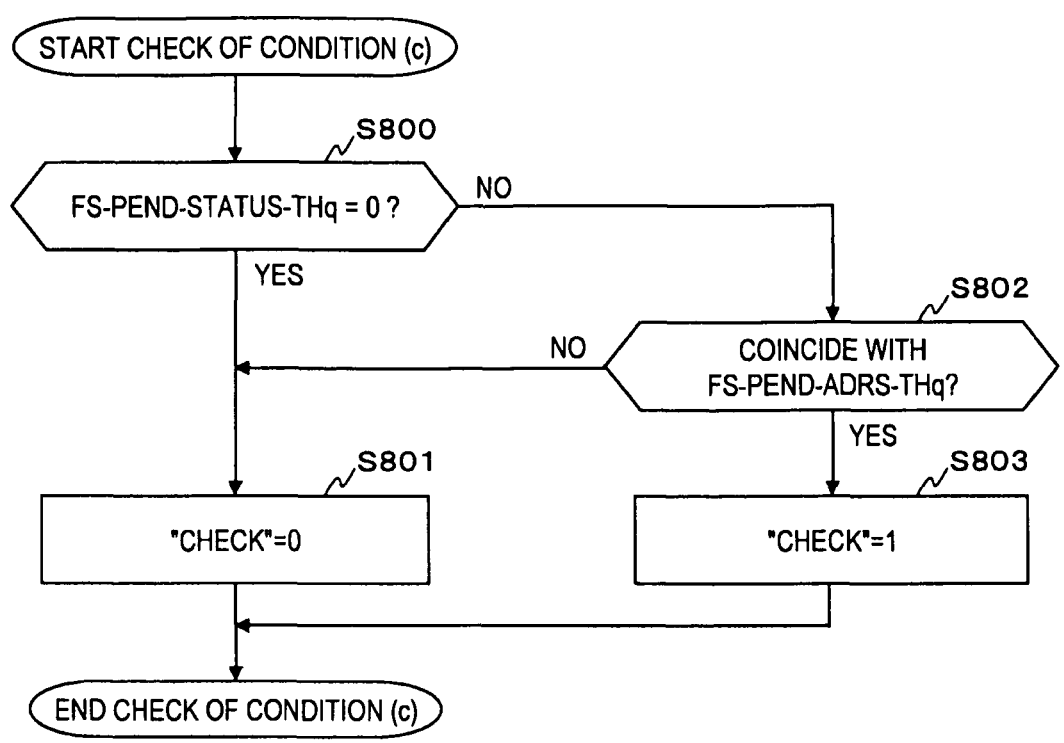
FIG. 12 illustrates a flowchart executed by the priority control circuit.

Specifically, as illustrated in the flowchart of FIG. 12, the priority control circuit 208 determines whether a value of FS-PEND-STATUS-THq concerning the other thread q stored in the FS instruction status information storing unit 209 is 0. When the value is 1 (when the thread q is executing a fetch and store request), the priority control circuit 208 further determines whether an address designated by the access request selected by the selection circuit 205 coincides with an address of FS-PEND-ADRS-THq concerning the other thread q stored in the FS instruction status information storing unit 209. When it is determined according to these kinds of determination processing that a fetch and store request with the same data set as an access destination is executed in the thread q, the priority control circuit 208 sets 1 in the variable "check". Otherwise, the priority control circuit 208 sets 0 in the variable "check".

As explained later, the priority control circuit 208 starts processing of access requests when 0 is set in the variable "check" and puts the processing of access requests on standby when 1 is set in the variable "check". Therefore, the priority control circuit 208 performs check concerning the condition (c) according to the flowchart of FIG. 12.

Subsequently, in step S702 of the flowchart of FIG. 11, the priority control circuit 208 determines whether a value of the variable "check" is 0. When it is determined that the value of the variable "check" is 1 rather than 0, the priority control circuit 208 proceeds to step S708, puts processing of the access request of the thread p selected by the selection circuit 205 on standby, and ends the processing in order to wait for completion of processing of a preceding request.

In other words, since the other thread q is executing the fetch and store request for the same data, the priority control circuit 208 puts processing of the access request of the thread p selected by the selection circuit 205 on standby.

On the other hand, when it is determined in the determination processing in step S702 that the value of the variable "check" is 0, the priority control circuit 208 proceeds to step S703 and determines whether the access request selected by the selection circuit 205 is the fetch and store request.

Figure 13:
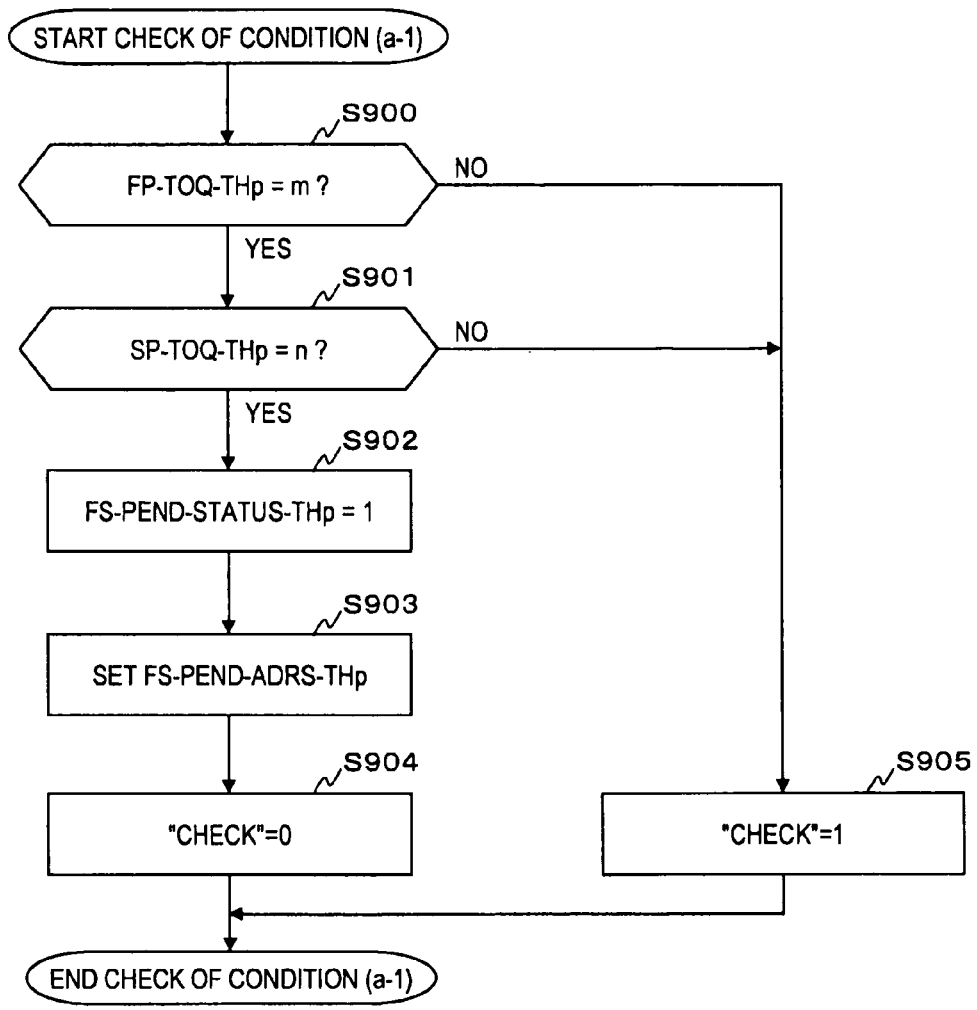
FIG. 13 illustrates a flowchart executed by the priority control circuit.

When it is determined in the determination processing in step S703 that the access request selected by the selection circuit 205 is the fetch and store request, the priority control circuit 208 proceeds to step S704 and performs check concerning the condition (a-1) according to the flowchart of FIG. 13.

Specifically, as illustrated in the flowchart of FIG. 13, when FP-TOQ-THp indicates an m-th entry and SP-TOQ-THp indicates an n-th entry, this indicates that the thread p may enter execution because the fetch and store request selected by the selection circuit 205 is an oldest access request. Therefore, the priority control circuit 208 sets 0 in the variable "check", in addition, sets 1 in FS-PEND-STATUS-THp in order to indicate that the thread p enters processing of the fetch and store request, and registers an address in FS-PEND-ADRS-THp. Otherwise, the priority control circuit 208 sets 1 in the variable "check" to perform check concerning the condition (a-1).

Figure 14:
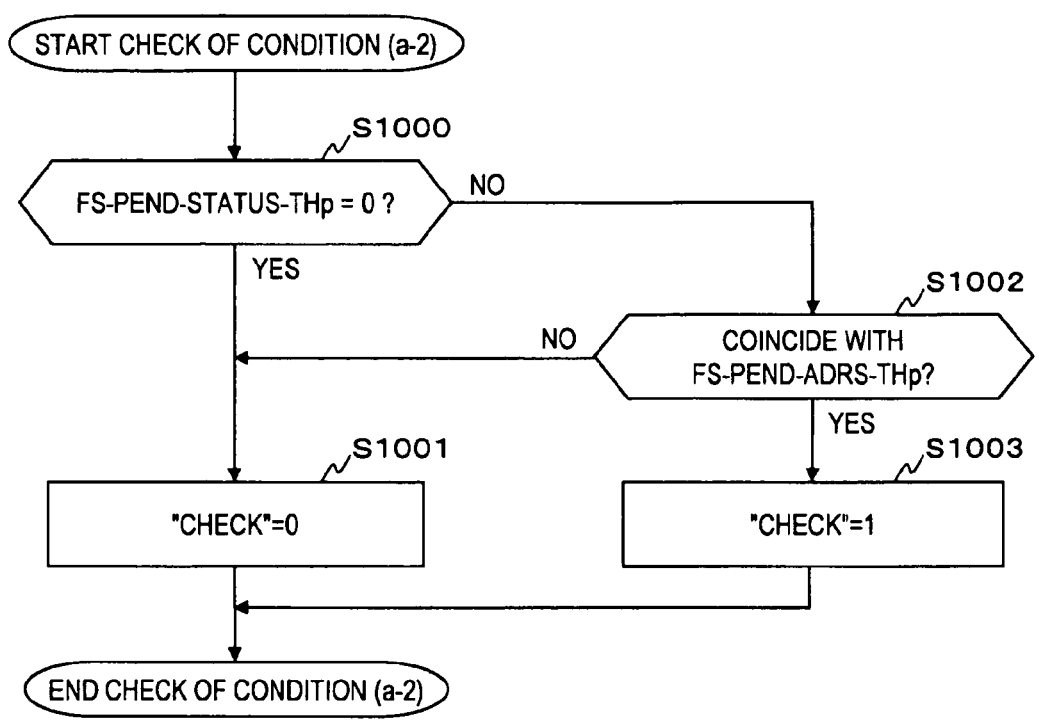
FIG. 14 illustrates a flowchart executed by the priority control circuit.

On the other hand, when it is determined in the determination processing in step S703 of the flowchart of FIG. 11 that the access request selected by the selection circuit 205 is not the fetch and store request, the priority control circuit 208 proceeds to step S705 and performs check concerning the condition (a-2) according to the flowchart of FIG. 14.

Specifically, as illustrated in the flowchart of FIG. 14, the priority control circuit 208 determines whether a value of FS-PEND-STATUS-THp concerning the thread p stored in the FS instruction status information storing unit 209 is 0. When the value is 1 (when the thread p is executing the fetch and store request), the priority control circuit 208 further determines whether the address designated by the access request selected by the selection circuit 205 coincides with an address of FS-PEND-ADRS-THp concerning the thread p stored in the FS instruction status information storing unit 209.

When it is determined in these kinds of determination processing that the thread p is executing the fetch and store request for the same data earlier, this indicates that the access request selected by the selection circuit 205 is not executed. Therefore, the priority control circuit 208 sets 1 in the variable "check". Otherwise, the priority control circuit 208 sets 0 in the variable "check" to perform check concerning the condition (a-2).

Subsequently, in step S706 of the flowchart of FIG. 11, the priority control circuit 208 determines whether a value of the variable "check" is 0. When it is determined that the value of the variable "check" is 0, the priority control circuit 208 proceeds to step S707 and starts processing of the access request of the thread p selected by the selection circuit 205. On the other hand, when it is determined that the value of the variable "check" is 1, the priority control circuit 208 proceeds to step S708, puts processing of the access request of the thread p selected by the selection circuit 205 on standby, and ends the processing in order to wait for completion of processing of a prior request.

Thereafter, at a point when load and store processing of the fetch and store request is completed, the priority control circuit 208 resets FS-PEND-STATUS-THp to 0 and resumes the processing of the other request put on standby.

Figure 15:
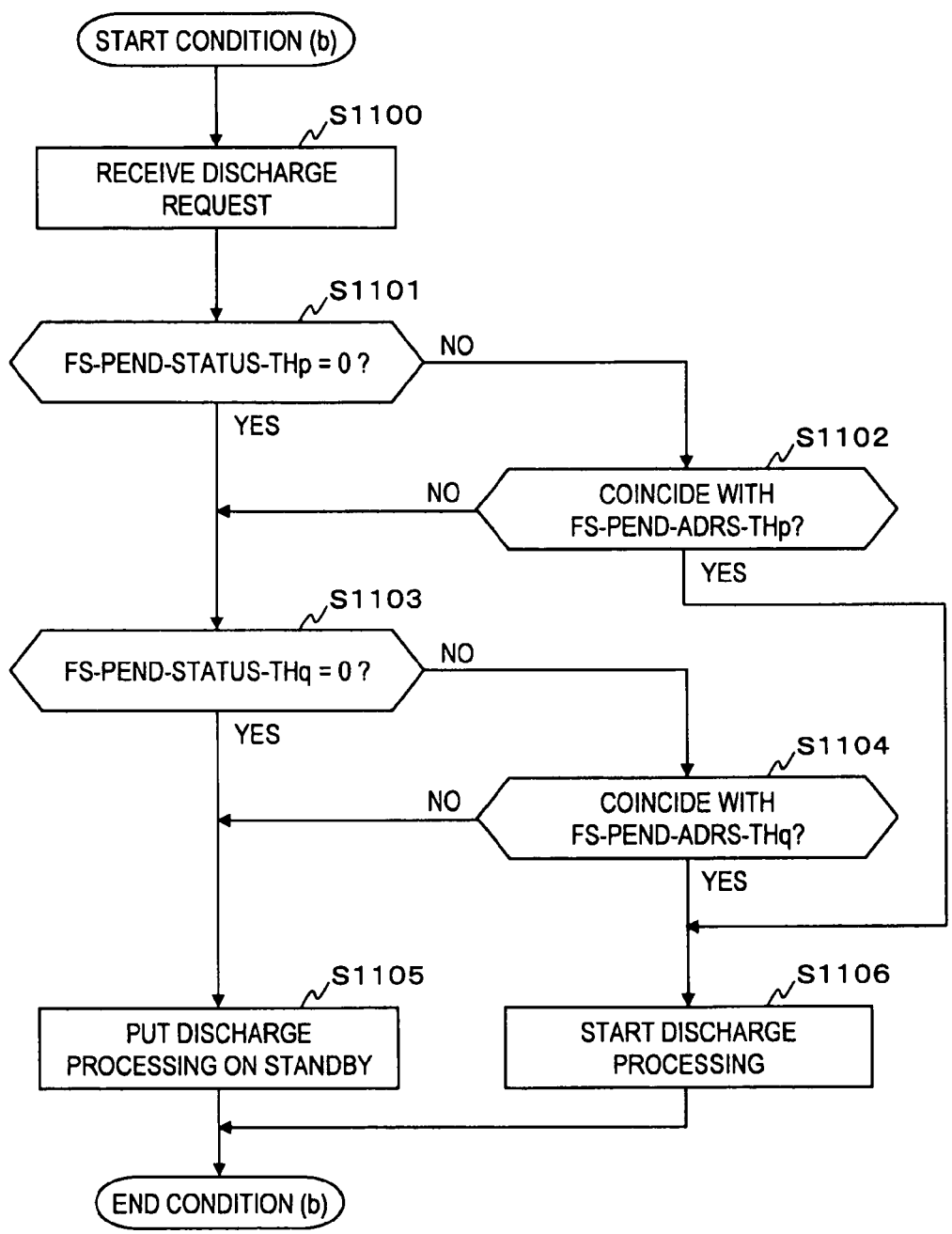
FIG. 15 illustrates a flowchart executed by the priority control circuit.

On the other hand, concerning the condition (b), the priority control circuit 208 performs check of the condition (b) according to the flowchart of FIG. 15.

Specifically, as illustrated in the flowchart of FIG. 15, the priority control circuit 208 determines whether a value of FS-PEND-STATUS-THp concerning the thread p stored in the FS instruction status information storing unit 209 is 0. When the value of FS-PEND-STATUS-THp is 1, the priority control circuit 208 determines whether the address designated by the access request selected by the selection circuit 205 coincides with the address of FS-PEND-ADRS-THp concerning the thread p stored in the FS instruction status information storing unit 209.

The priority control circuit 208 determines whether a value of FS-PEND-STATUS-THq concerning the thread q stored in the FS instruction status information storing unit 209 is 0. When the value of FS-PEND-STATUS-THq is 1, the priority control circuit 208 determines whether the address designated by the access request selected by the selection circuit 205 coincides with the address of FS-PEND-ADRS-THq concerning the thread q stored in the FS instruction status information storing unit 209.

When it is determined according to these kinds of determination processing that both the thread p and the thread q are not executing the fetch and store request and when, although one of the threads or both the threads are executing the fetch and store request, the fetch and store request targets data different from target data of the access request selected by the selection circuit 205, the priority control circuit 208 starts discharge of the target data from the cache RAM 201. Otherwise, the priority control circuit 208 puts discharge of the target data from the cache RAM 201 on standby to perform check concerning the condition (b).

In this way, in the primary cache control unit 200 configured as illustrated in FIG. 10, if target data of the fetch and stored request is different, it is possible to execute processing of one fetch and store request for each of the threads.

In the primary cache control unit 200 configured as illustrated in FIG. 10, it is also possible to prevent, using REQ-TAKEN-THREAD generated by the last processing thread indication signal control circuit 21 illustrated in FIG. 8, only access requests of a specific thread from continuing to be processed.

Figure 16:
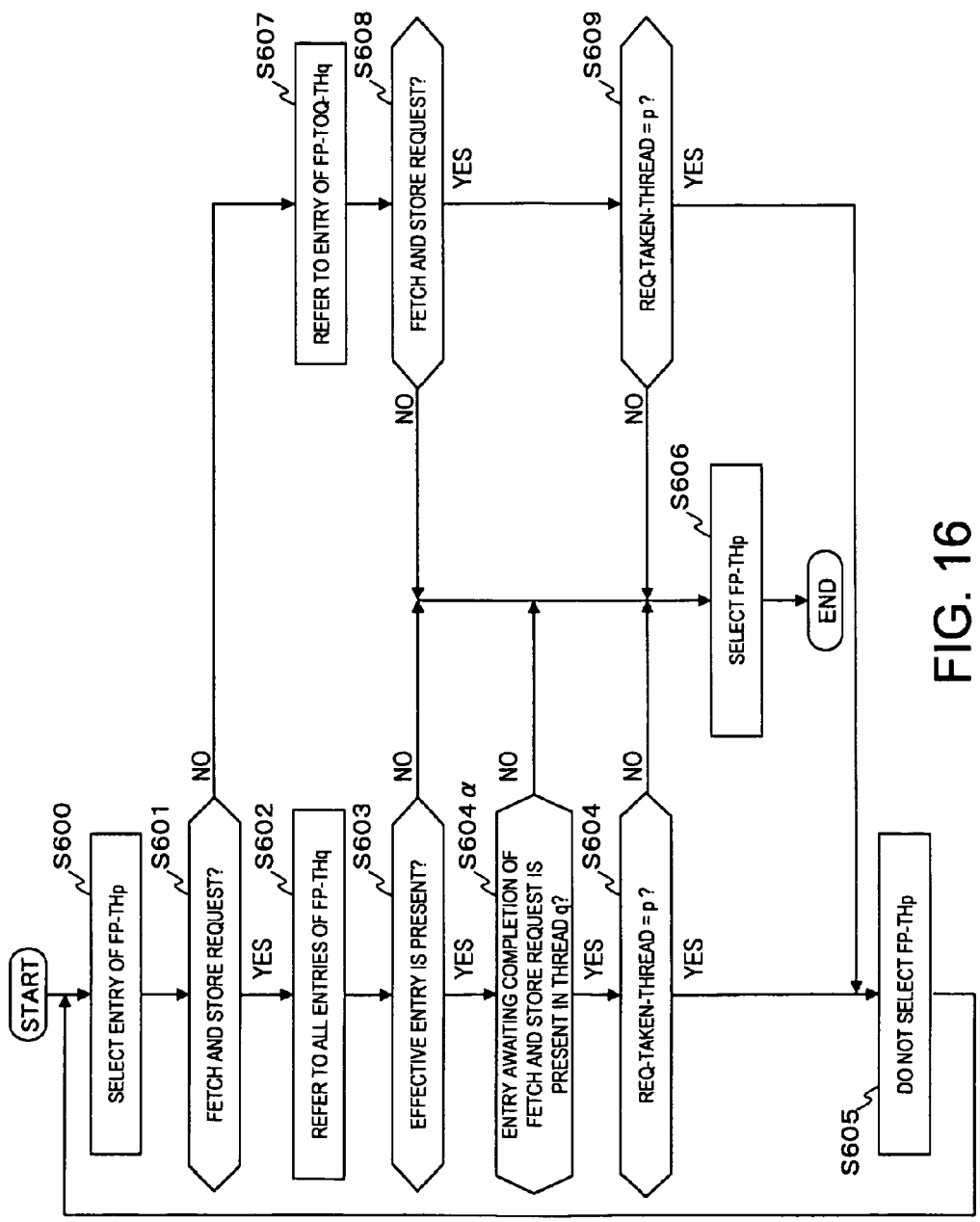
FIG. 16 illustrates a flowchart executed by the priority control circuit.
Figure 17:
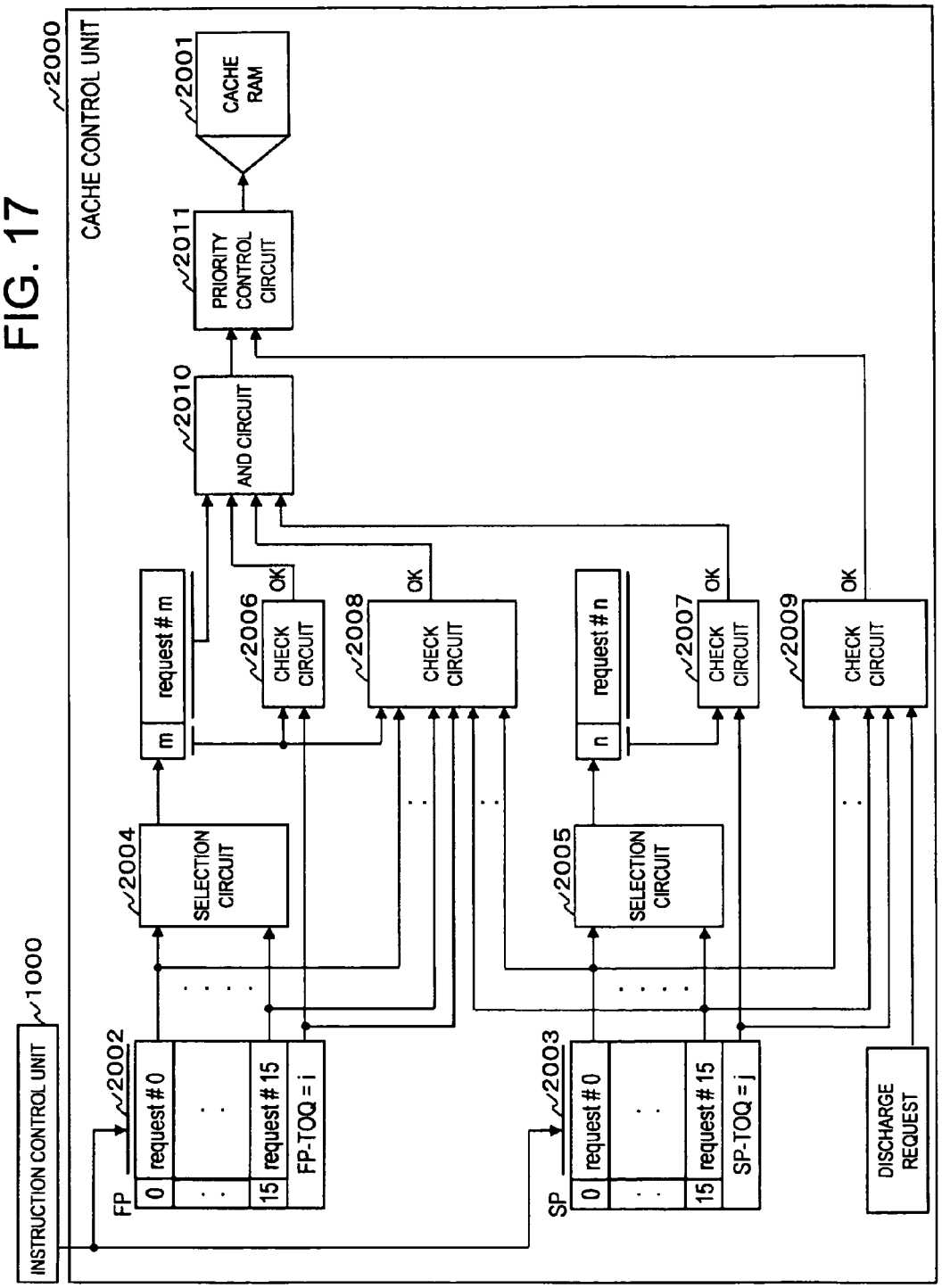
FIG. 17 illustrates a diagram of cache control used in a processor of a single thread system.
Figure 18:
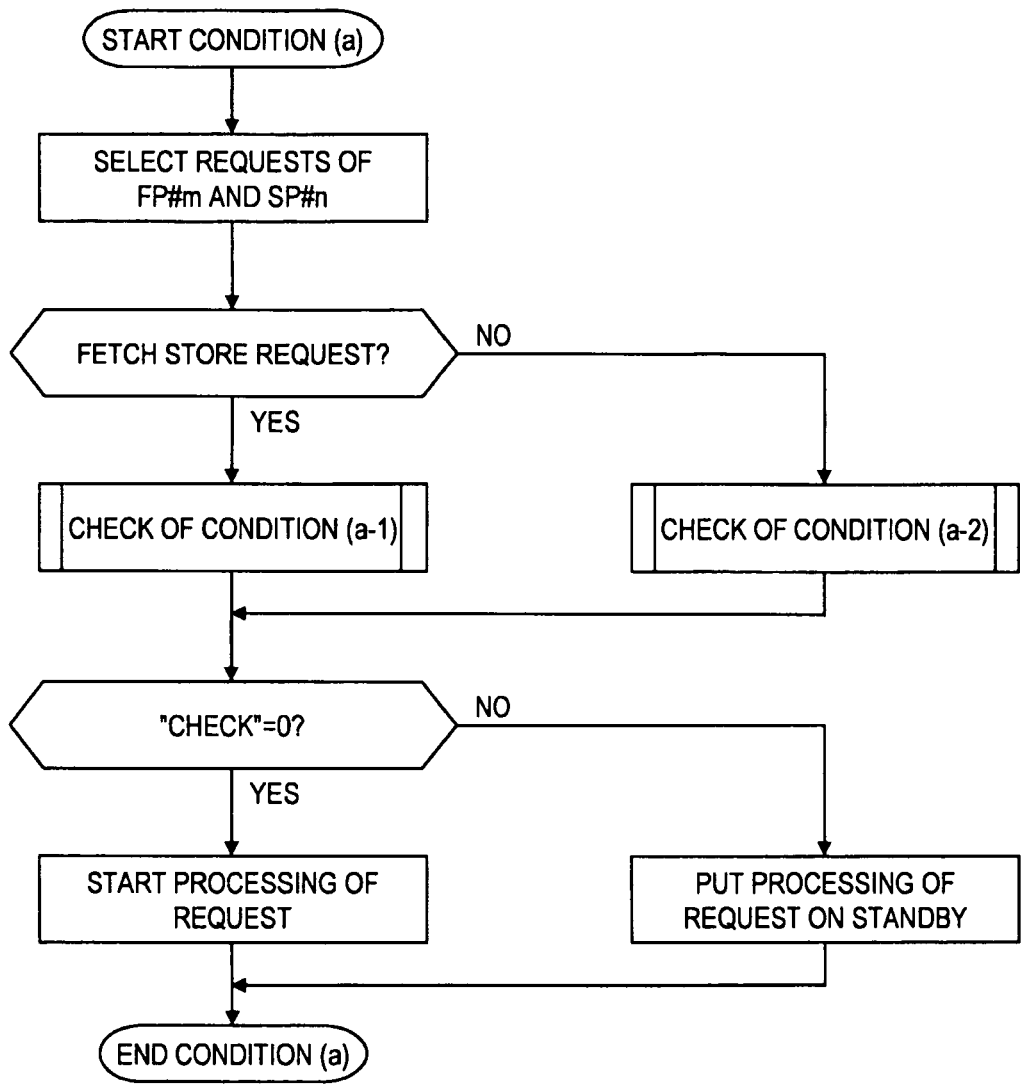
FIG. 18 illustrates a flowchart of cache control processing used in the processor of the single thread system.
Figure 19:
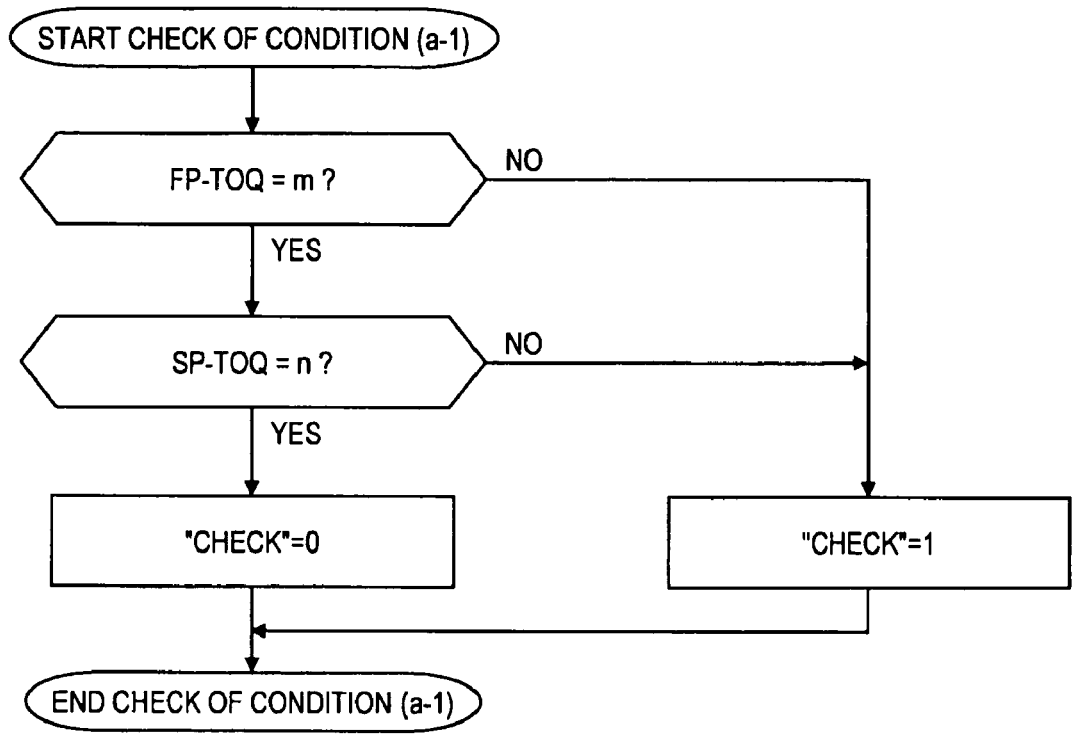
FIG. 19 illustrates a flowchart of the cache control processing used in the processor of the single thread system.
Figure 20:
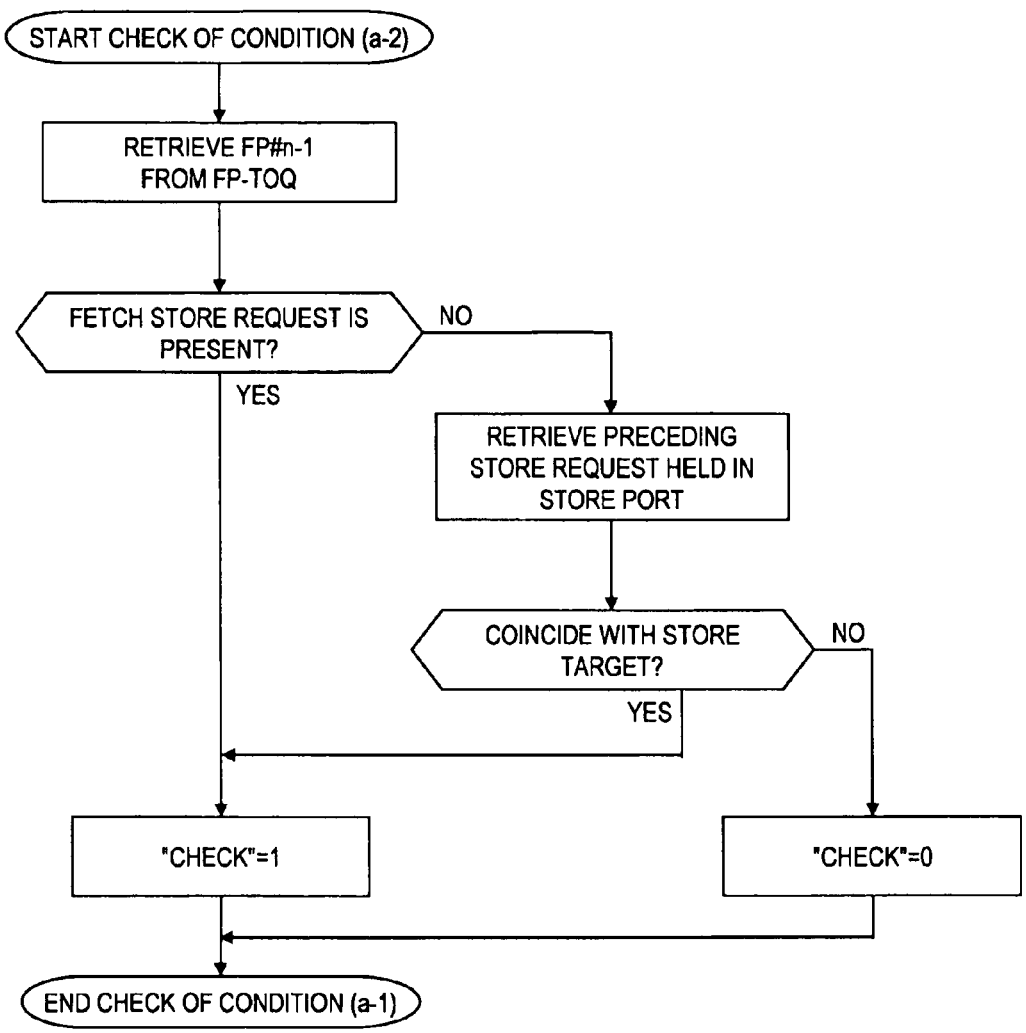
FIG. 20 illustrates a flowchart of the cache control processing used in the processor of the single thread system.
Figure 21:
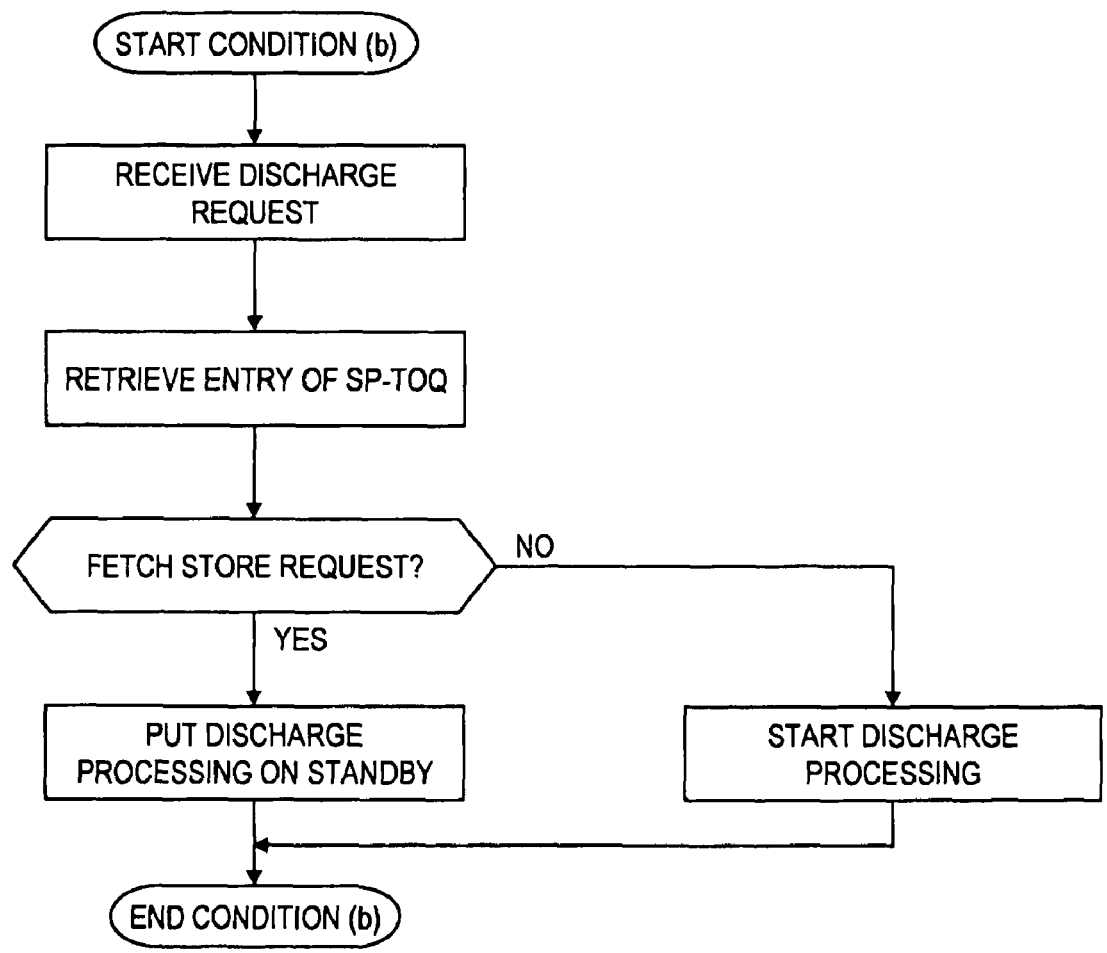
FIG. 21 illustrates a flowchart of the cache control processing used in the processor of the single thread system.

A flowchart executed by the priority control circuit 208 included in the primary cache control unit 200 configured as illustrated in FIG. 10 when the cache control device includes the last processing thread indication signal control circuit 210 is illustrated in FIG. 16.

In executing the flowchart of FIG. 9, in step S602, the priority control circuit 208 refers to all the entries of the fetch port 202-*q* of the other thread q. In the subsequent step S603, the priority control circuit 208 determines whether an effective entry is present among the entries of the fetch port 202-*q* referred to. When it is determined that the effective entry is present, i.e., it is determined that an access request put on standby because of a fetch and store request is present, the priority control circuit 208 immediately proceeds to step S604 and determines whether REQ-TAKEN-THREAD indicates that a thread that completes processing last is the thread p.

On the other hand, in executing the flowchart of FIG. 16, only access requests with data same as the target data of the fetch and store request set as access destinations are put on standby. Therefore, taking this into account, in step S604α following step S603, the priority control circuit 208 determines whether an access request awaiting completion of the fetch and store request (an access request put on standby because addresses coincide with each other) is present in the thread q. When such an access request is present, the priority control circuit 208 proceeds to the processing in step S604. When such an access request is not present, the priority control circuit 208 proceeds to the processing in step S606.

In this way, in the primary cache control unit 200 configured as illustrated in FIG. 10, according to the flowchart of FIG. 16, the priority control circuit 208 also performs processing to prevent, using REQ-TAKEN-THREAD, only access requests of a specific thread from continuing to be processed.

The cache control device and control method are explained above according to the embodiments illustrated in the figures. However, the cache control device and control method are not limited to them. For example, in one of the embodiments, it is assumed that the cache control device is mounted on the processor of the SMT system in which the two threads operate. However, the cache control device can also be directly applied when three or more threads operate.

The present invention can be applied to cache control in the processor of the SMT system. By applying the present invention, it is possible to realize, with a simple configuration, exclusive control processing necessary in processing an atomic instruction such as a CAS instruction in the processor of the SMT system.

What is claimed is:

1. A cache control device that controls access requests to a cache shared by a plurality of threads that are simultaneously executed, the cache control device comprising:
a storing unit provided in association with each of the threads, the storing unit storing a flag that indicates a first defined value when the thread enters execution of an atomic instruction for indivisibly executing plural kinds of processing and indicates a second defined value different from the first defined value when the atomic instruction is completed;
a determining unit for determining, when an access request is issued from a certain thread, referring to the flag value stored by the storing unit, whether a thread different from the thread that issues the access request is executing an atomic instruction; and
an executing unit for executing, when the determining unit determines that the different thread is executing the atomic instruction, processing for putting the issued access request on standby.

2. The cache control device according to claim 1, further comprising an instructing unit for determining, when there is a discharge request for data from a cache, referring to the flag value stored by the storing unit, whether all the threads are not executing the atomic instruction and instructing, when it is determined that all the threads are not executing the instruction, execution of the discharge processing for data from the cache.

3. The cache control device according to claim 1, further comprising an intra-thread exclusive control unit for executing exclusive control concerning the atomic instruction in the threads referring to the flag value stored by the storing unit.

4. The cache control device according to claim 1, further comprising:
a second storing unit for storing information indicating which of the threads a thread that performs processing of an access request last is;
a second determining unit for determining, when an access request related to an atomic instruction is issued from a certain thread, concerning the threads other than the thread, whether an access request put on standby by the standby processing is present; and
a determining unit for specifying, when the second determining unit determines that an access request put on standby by the standby processing is present, referring to the information stored by the second storing unit, a thread that performs processing of an access request last and determining whether the access request related to the atomic instruction issued from the certain thread is to be selected with priority given to access requests issued by the threads other than the specified thread or the access request put on standby is to be selected.

5. The cache control device according to claim 4, further comprising:
a third determining unit for determining, when an access request related to a non-atomic instruction is issued from a certain thread, concerning the threads other than the thread, whether there is an issuance request for an access request related to the atomic instruction; and
a second determining unit for specifying, when the third determining unit determines that there is an issuance request for an access request related to the atomic instruction, referring to the information stored in the second storing unit, a thread that performs processing of an access request last and determining whether the access request related to a non-atomic instruction issued from the certain thread is to be selected with priority given to access requests issued by the threads other than the specified thread or the access request related to the atomic instruction having the issuance request is to be selected.

6. A cache control device that controls access requests to a cache shared by a plurality of threads that are simultaneously executed, the cache control device comprising:
a storing unit provided in association with each of the threads, the storing unit storing a flag that indicates a first defined value when the thread enters execution of an atomic instruction for indivisibly executing plural kinds of processing and indicates a second defined value different from the first defined value when the atomic instruction to be executed is completed and storing, when the thread enters execution of the atomic instruction, address information of an access destination of the atomic instruction to be executed;
a determining unit for determining, when an access request is issued from a certain thread, referring to the flag value stored by the storing unit, whether a thread different from the thread that issues the access request is executing an atomic instruction and, further, determining, when it is determined that the different thread is executing the atomic instruction, referring to the address information stored by the storing unit, whether the address information of the access destination of the atomic instruction being executed by the different thread and address information designated by the issued access request coincide with each other; and
an executing unit for executing, when the determining unit determines that the different thread is executing the atomic instruction and determines that the address information of the access destination of the atomic instruction being executed by the different thread and the address information designated by the issued access request coincide with each other, processing for putting the issued access request on standby.

7. The cache control device according to claim 6 further comprising an instructing unit for determining, when there is a discharge request for data from a cache, referring to the flag value and the address information stored by the storing unit, whether all the threads are not executing an atomic instruction with address information coinciding with address information indicated by the discharge request set as an access destination and instructing, when it is determined that all the threads are not executing the instruction, execution of the discharge processing for data from the cache.

8. The cache control device according to claim 6, further comprising an intra-thread exclusive control unit for executing exclusive control concerning the atomic instruction in the threads referring to the flag value and the address information stored by the storing unit.

9. A cache control method executed by a cache control device that controls access requests to a cache shared by a plurality of threads that are simultaneously executed, the cache control method comprising:
adopting a configuration including a storing unit provided in association with each of the threads, the storing unit storing a flag that indicates a first defined value when the thread enters execution of an atomic instruction for indivisibly executing plural kinds of processing and indicates a second defined value different from the first defined value when the atomic instruction is completed, writing the first defined value in a relevant flag stored in the storing unit when the thread enters execution of the atomic instruction and writing the second defined value when the atomic instruction is completed;

determining, when an access request is issued from a certain thread, referring to the flag value stored by the storing unit, whether a thread different from the thread that issues the access request is executing an atomic instruction; and executing, when it is determined according to the determination processing that the different thread is executing the atomic instruction, processing for putting the issued access request on standby.

10. The cache control method according to claim 9, comprising determining, when there is a discharge request for data from a cache, referring to the flag value stored by the storing unit, whether all the threads are not executing the atomic instruction and instructing, when it is determined that all the threads are not executing the instruction, execution of the discharge processing for data from the cache.

11. A cache control method executed by a cache control device that controls access requests to a cache shared by a plurality of threads that are simultaneously executed, the cache control method comprising:

adopting a configuration including storing unit provided in association with each of the threads, the storing unit storing a flag that indicates a first defined value when the thread enters execution of an atomic instruction for indivisibly executing plural kinds of processing and indicates a second defined value different from the first defined value when the atomic instruction to be executed is completed and storing, when the thread enters execution of the atomic instruction, address information of an access destination of the atomic instruction to be executed, the cache control device writing the first defined value in a relevant flag stored in the storing unit and writing the address information of the access destination of the atomic instruction in the storing unit when the thread enters execution of the atomic instruction and writing the second defined value in the flag when the atomic instruction is completed;

determining, when an access request is issued from a certain thread, referring to the flag value stored by the storing unit, whether a thread different from the thread that issues the access request is executing an atomic instruction and, further, determining, when it is determined that the different thread is executing the atomic instruction, referring to the address information stored by the storing unit, whether the address information of the access destination of the atomic instruction being executed by the different thread and address information designated by the issued access request coincide with each other; and executing, when it is determined according to the determination processing that the different thread is executing the atomic instruction and determines that the address information of the access destination of the atomic instruction being executed by the different thread and the address information designated by the issued access request coincide with each other, processing for putting the issued access request on standby.

12. The cache control method according to claim 11, comprising determining, when there is a discharge request for data from a cache, referring to the flag value and the address information stored by the storing unit, whether all the threads are not executing an atomic instruction with address information coinciding with address information indicated by the discharge request set as an access destination and instructing, when it is determined that all the threads are not executing the instruction, execution of the discharge processing for data from the cache.

* * * * *

UNITED STATES PATENT AND TRADEMARK OFFICE
CERTIFICATE OF CORRECTION

PATENT NO. : 8,261,021 B2
APPLICATION NO. : 12/654376
DATED : September 4, 2012
INVENTOR(S) : Naohiro Kiyota Page 1 of 1

It is certified that error appears in the above-identified patent and that said Letters Patent is hereby corrected as shown below:

Title Page, insert:

-- (63) Related U.S. Application Data;
Continuation of application No. PCT/JP2007/062376, filed on Jun. 20, 2007. --

Signed and Sealed this
Twelfth Day of March, 2013

Teresa Stanek Rea
*Acting Director of the United States Patent and Trademark Office*